United States Patent
Mariotto et al.

(10) Patent No.: US 10,164,509 B2
(45) Date of Patent: Dec. 25, 2018

(54) SEPARATELY EXCITED ELECTRIC MACHINE WITH AT LEAST ONE PRIMARY MAGNETIC CIRCUIT AND AT LEAST TWO SECONDARY MAGNETIC CIRCUITS

(71) Applicants: AIRBUS HELICOPTERS, Marignane (FR); SINTERTECH, Veurey-Voroize (FR); MBDA FRANCE, Le Plessis-robinson (FR)

(72) Inventors: Damien Mariotto, Lambesc (FR); Alix Bernot, Vizille (FR)

(73) Assignees: AIRBUS HELICOPTERS, Marignane (FR); SINTERTECH, Veurey-Voroize (FR); MBDA FRANCE, Le Plessis-robinson (FR)

(*) Notice: Subject to any disclaimer, the term of this patent is extended or adjusted under 35 U.S.C. 154(b) by 588 days.

(21) Appl. No.: 14/972,261

(22) Filed: Dec. 17, 2015

(65) Prior Publication Data

US 2016/0181899 A1    Jun. 23, 2016

(30) Foreign Application Priority Data

Dec. 18, 2014 (FR) .................................. 14 02908

(51) Int. Cl.
*H02K 19/12* (2006.01)
*H02K 1/14* (2006.01)
(Continued)

(52) U.S. Cl.
CPC ............ *H02K 19/12* (2013.01); *H02K 1/145* (2013.01); *H02K 3/12* (2013.01); *H02K 19/06* (2013.01); *H02K 19/103* (2013.01); *H02K 19/20* (2013.01)

(58) Field of Classification Search
CPC .......... H02K 19/12; H02K 1/145; H02K 3/12; H02K 19/06; H02K 19/103; H02K 19/20
See application file for complete search history.

(56) References Cited

U.S. PATENT DOCUMENTS

| 2,417,880 | A |   | 3/1947 | Milburn et al. |
|-----------|---|---|--------|----------------|
| 3,950,663 | A | * | 4/1976 | Mead .................. H02K 19/103 310/49.19 |

(Continued)

FOREIGN PATENT DOCUMENTS

| EP | 0583530 A1 | 2/1994 |
|----|------------|--------|
| FR | 2969409    | 6/2012 |

(Continued)

OTHER PUBLICATIONS

EP0583530A1, Abstract & Machine Translation.
(Continued)

*Primary Examiner* — Mohamad Musleh
(74) *Attorney, Agent, or Firm* — Brooks Kushman P.C.

(57) ABSTRACT

A separately excited electric machine having a stator provided with at least one exciter unit and a rotor provided with strips. Each exciter unit comprises two secondary magnetic circuits and one primary magnetic circuit. Each secondary magnetic circuit comprises a stator exciter winding and two annular yokes provided with teeth. The primary magnetic circuit comprises a rotor exciter winding and an annular ring. First magnetic fluxes generated by the primary magnetic circuit circulate around loops in each strip and second magnetic fluxes generated by the secondary magnetic circuits circulate around loops in the strips, the teeth, and the ring. Each strip thus has a first north pole and a first south pole, with the teeth comprising in alternation second north poles and second south poles.

18 Claims, 12 Drawing Sheets

(51) Int. Cl.
*H02K 3/12* (2006.01)
*H02K 19/20* (2006.01)
*H02K 19/06* (2006.01)
*H02K 19/10* (2006.01)

(56) References Cited

U.S. PATENT DOCUMENTS

| | | | |
|---|---|---|---|
| 4,206,374 A | 6/1980 | Goddijn | |
| 5,682,073 A | 10/1997 | Mizuno | |
| 6,153,953 A * | 11/2000 | Isozaki | H02K 37/14 310/112 |
| 6,259,176 B1 * | 7/2001 | Isozaki | H02K 37/12 310/162 |
| 7,605,571 B2 | 10/2009 | Enomoto et al. | |
| 2004/0178684 A1 * | 9/2004 | Joong | H02K 41/031 310/12.24 |
| 2006/0115259 A1 * | 6/2006 | Ito | H02K 1/145 396/75 |
| 2008/0018195 A1 * | 1/2008 | Kitamura | H02K 1/145 310/257 |
| 2008/0018196 A1 * | 1/2008 | Enomoto | H02K 1/145 310/257 |
| 2014/0084716 A1 | 3/2014 | Bernot | |

FOREIGN PATENT DOCUMENTS

| | | |
|---|---|---|
| GB | 917263 | 1/1963 |
| JP | S59132379 U | 9/1984 |
| JP | S62160061 A | 7/1987 |
| JP | H0393451 A | 4/1991 |
| JP | H06351206 A | 12/1994 |
| JP | H0759310 A | 3/1995 |
| JP | H0965621 A | 3/1997 |
| JP | H09140107 A | 5/1997 |
| JP | 2006187075 A | 7/2006 |
| JP | 2007124884 A | 5/2007 |
| JP | 2008141853 A | 6/2008 |
| JP | 2011182600 A | 9/2011 |
| JP | 2015-243486 | 11/2016 |

OTHER PUBLICATIONS

JPS59132379U, U.S. Pat. No. 4,206,374.
JPS62160061A, Abstract & Machine Translation.
JPH0393451A, Abstract & Machine Translation.
JPH06351206A, U.S. Pat. No. 5,682,073.
JPH0759310A, Abstract & Machine Translation.
JPH0965621A, Abstract & Machine Translation.
JPH09140107A, Abstract & Machine Translation.
JP2006187075A, Abstract & Machine Translation.
JP2007124884A, U.S. Pat. No. 7,605,517 B2.
JP2008141853A, Abstract & Machine Translation.
JP2011182600A, Abstract & Machine Translation.
Japanese Office Action dated Nov. 22, 2016, Application No. 2015-243486, Mailing No. 532413, 4 Pages.
French Search Report for French Application No. FR 1402908, Completed by the French Patent Office dated Oct. 12, 2015, 7 Pages.

* cited by examiner

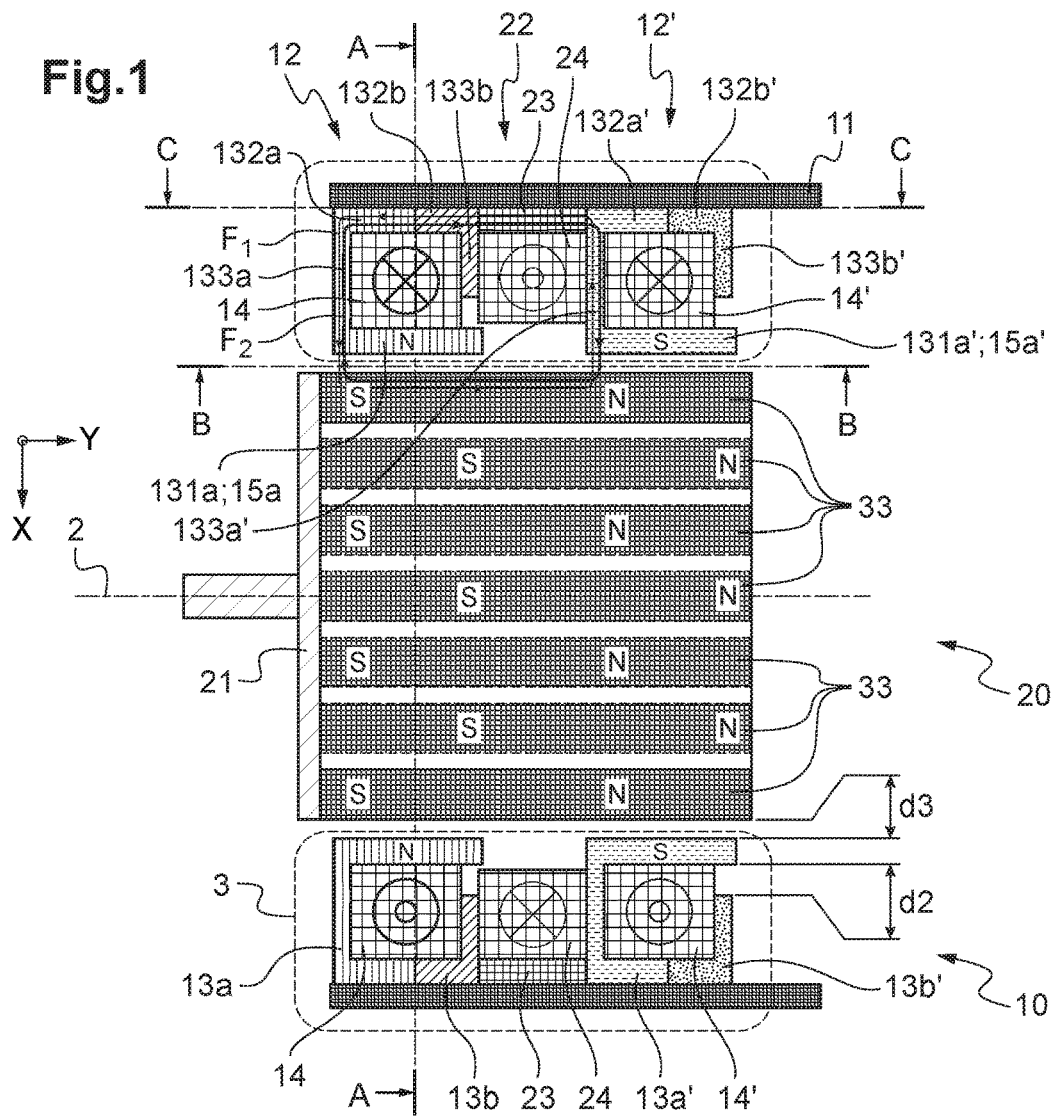
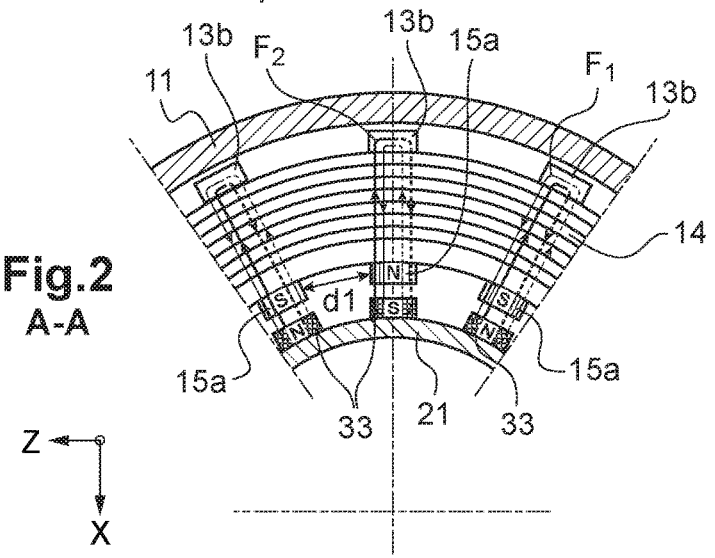

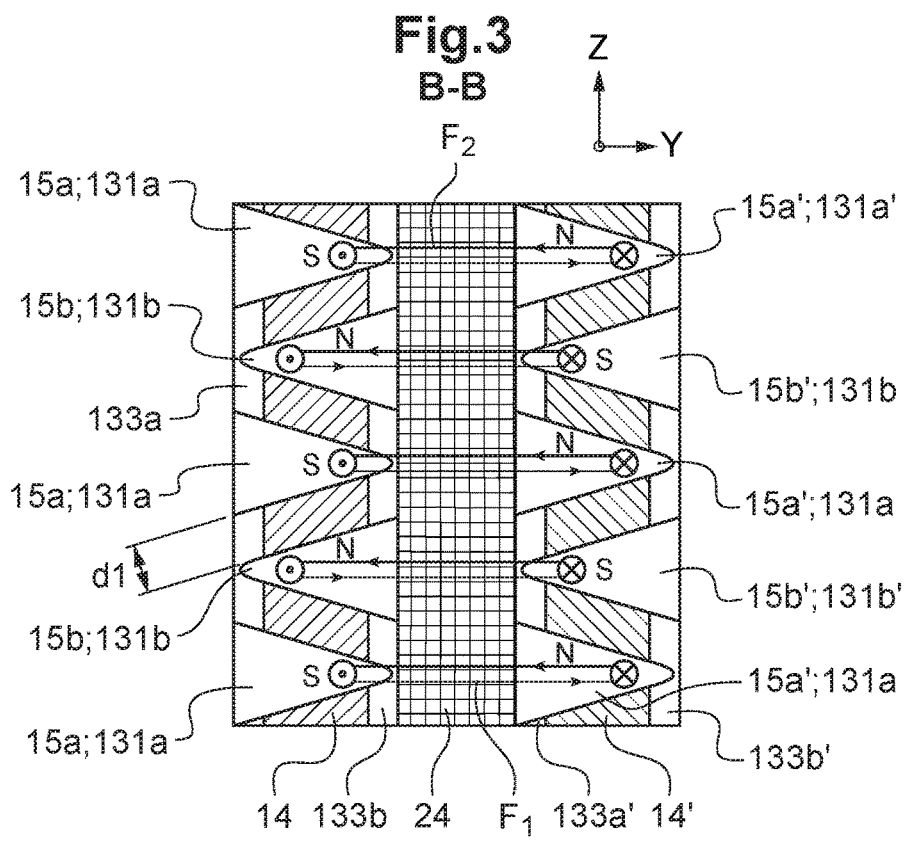
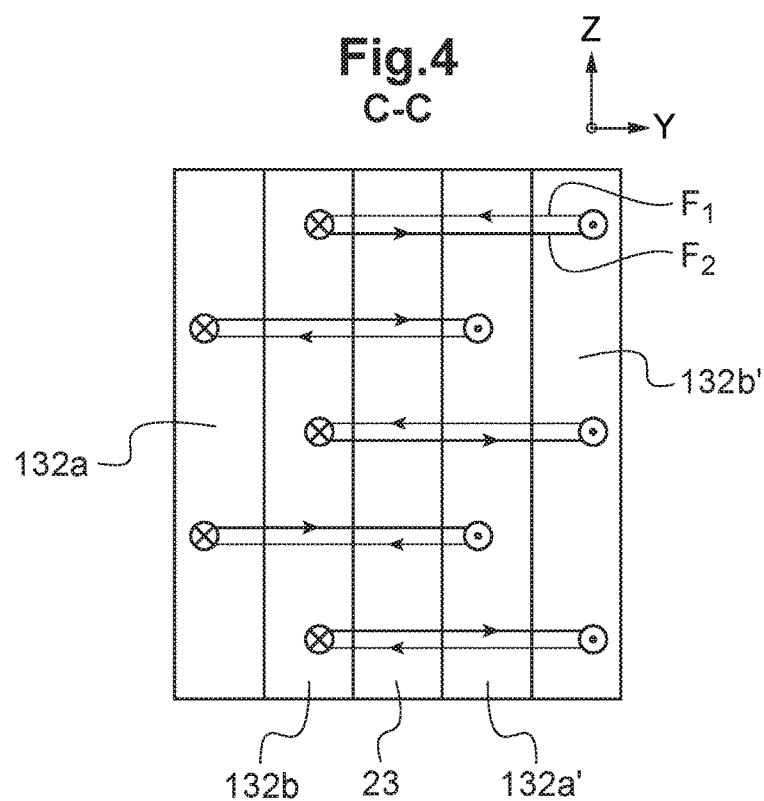

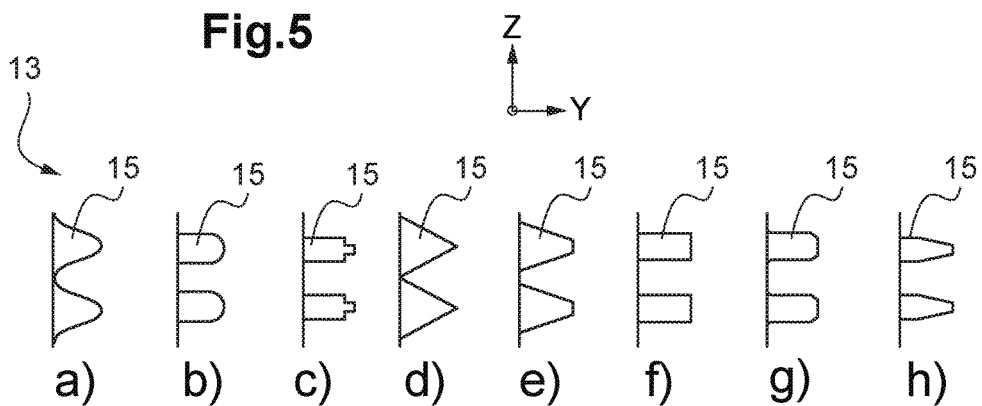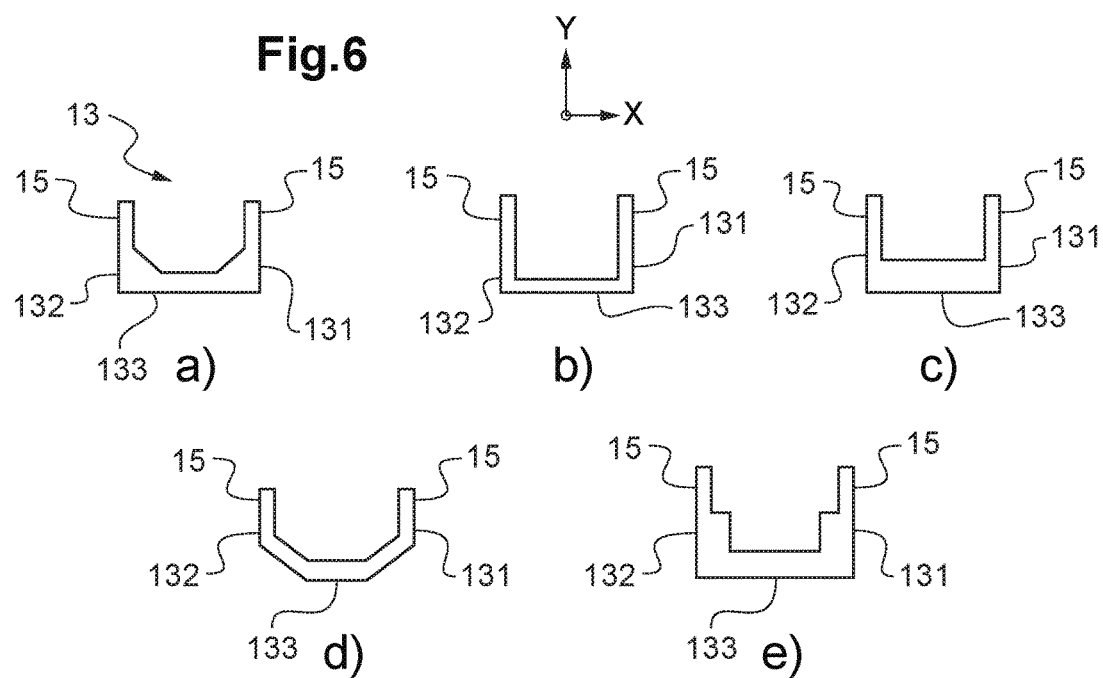

A-A

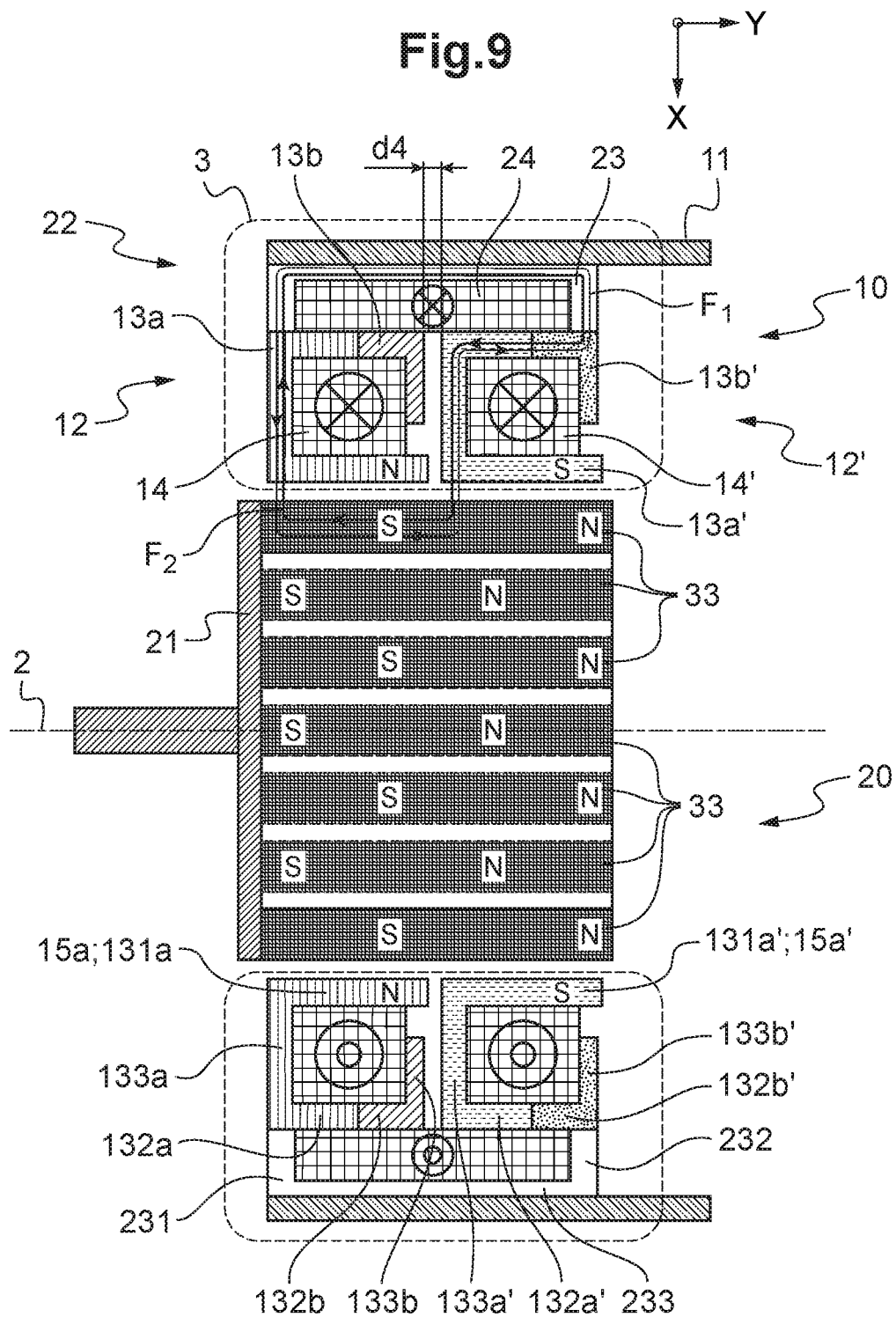

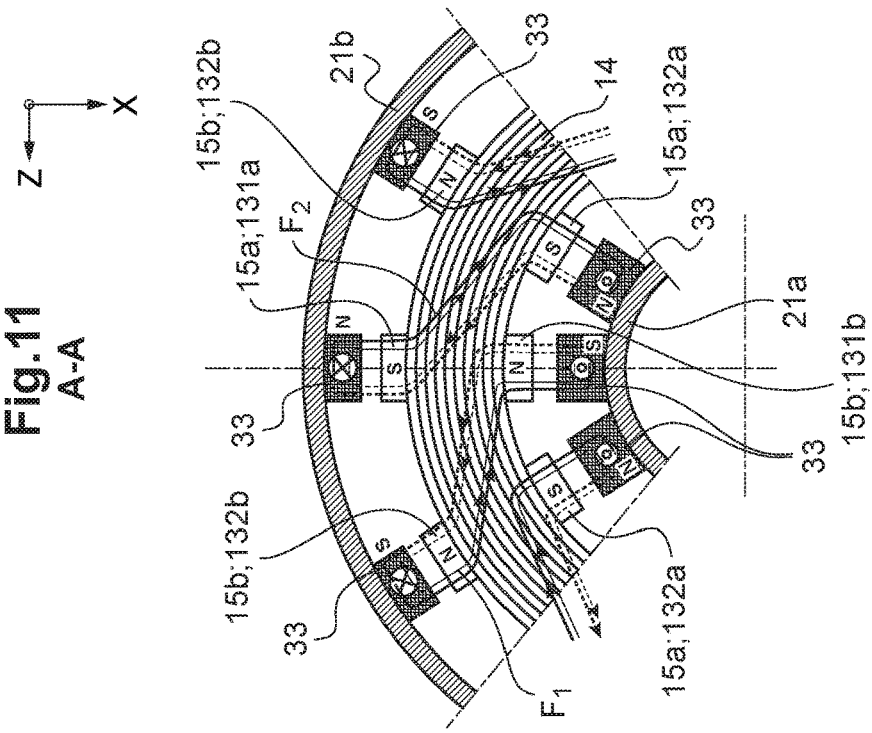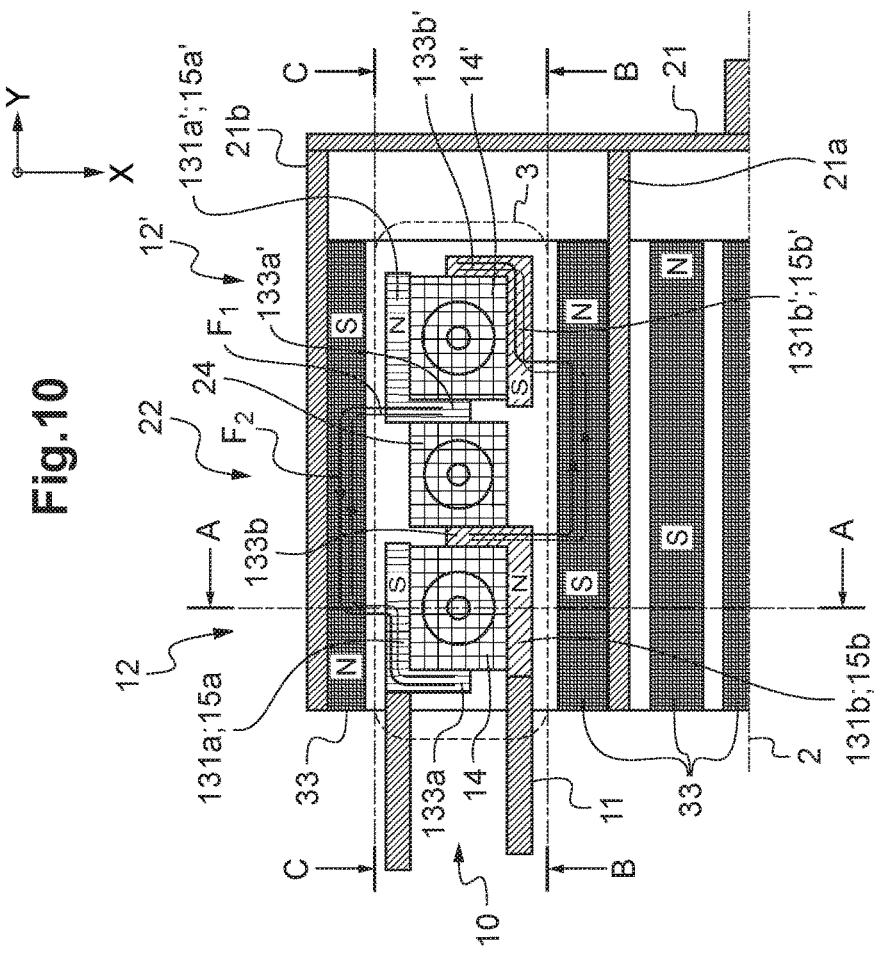

B-B

C-C

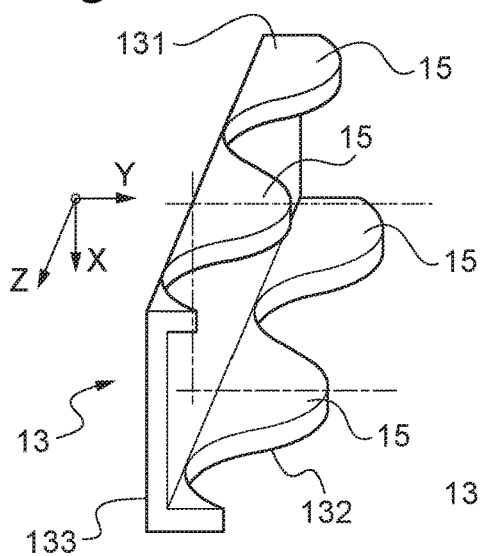
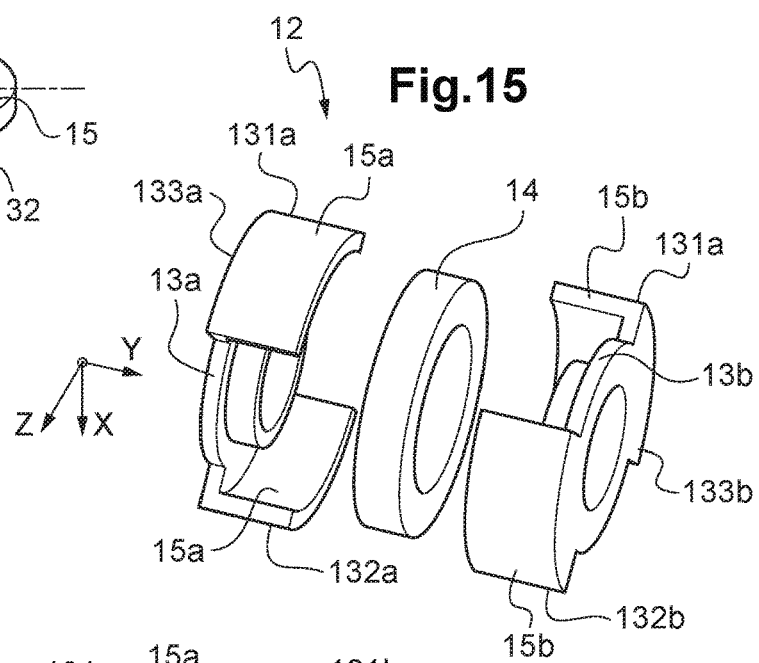
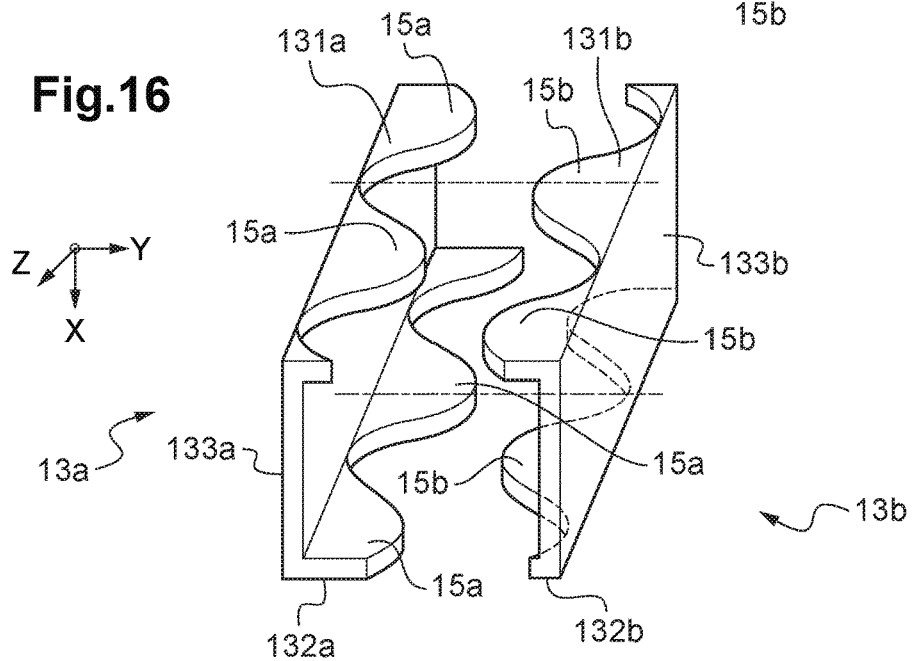

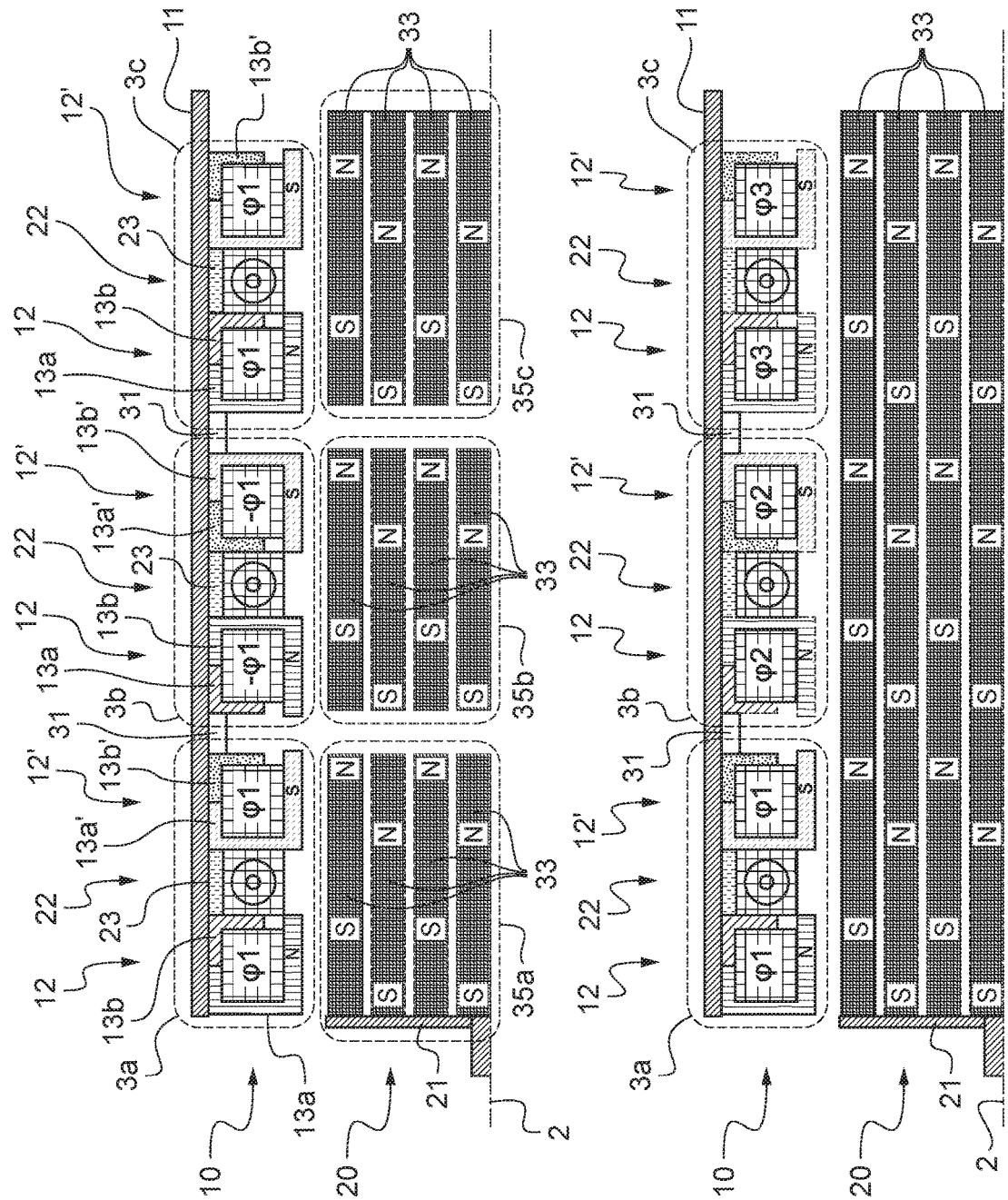

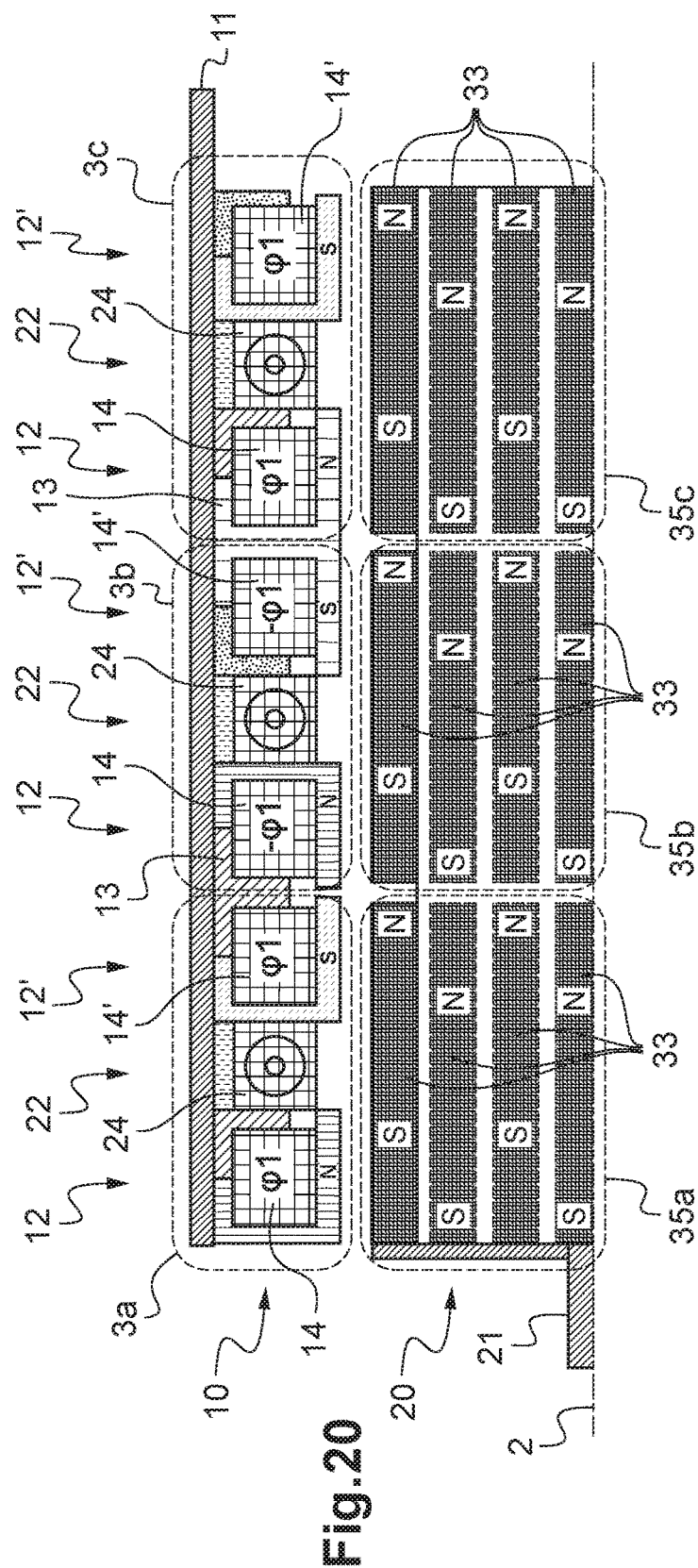

SEPARATELY EXCITED ELECTRIC MACHINE WITH AT LEAST ONE PRIMARY MAGNETIC CIRCUIT AND AT LEAST TWO SECONDARY MAGNETIC CIRCUITS

CROSS REFERENCE TO RELATED APPLICATION

This application claims priority to French patent application No. FR 14 02908 filed on Dec. 18, 2014, the disclosure of which is incorporated in its entirety by reference herein.

BACKGROUND OF THE INVENTION (1) Field of the Invention

The present invention relates to the field of electric machines. It relates to a separately excited reversible electric machine having at least one exciter unit formed by a primary magnetic circuit and two secondary magnetic circuits. Such an electric machine may be single-phase or polyphase.

(2) Description of Related Art

An electric machine that transforms electrical energy into mechanical energy, e.g. for the purpose of propelling a vehicle, is referred to as a "motor". An electric machine transforming mechanical energy into electrical energy, e.g. for generating electricity, is referred to as a "generator". Generators include both alternators that supply alternating current (AC) and dynamos that supply direct current (DC).

An electric motor may be adapted to be powered by DC or by single-phase or polyphase AC, for example three-phase AC. Likewise, an alternator may be adapted to generate AC that is single-phase or polyphase.

Nevertheless, it is preferable for polyphase AC to be balanced in order to enable operation to take place smoothly and without jolting the electric machine. Such balanced polyphase AC then forms a balanced electrical system with at least three phases and it is characterized in particular by the fact that the sum of the complex voltages (or currents) of each of the phases is zero, but without the amplitudes of the voltages (or currents) of each of the phases being zero simultaneously. Furthermore, the same phase shift is present between each of the phases of this alternating current.

An electric machine is said to be "reversible" when it can be used either as a motor or as a generator. Any electric machine can be reversible, with the distinction between the motor and generator functions being made only with reference to the purpose and utilization of the electric machine. The term "motor-generator" is also used if both functions are available on the electric machine.

The motors currently in use may be rotary, i.e. they produce angular movement and/or torque, or they may be linear, i.e. they produce linear movement and/or force.

In contrast, generators are essentially rotary.

A rotary electric machine is an electromechanical device having at least one stator that is stationary and at least one rotor that rotates relative to the stator and that may be located inside and/or outside the stator. The rotor is caused to rotate by interaction between two magnetic fields, associated respectively with the stator and with the rotor, thereby creating magnetic torque on the rotor. These are referred to respectively as a "stator magnetic field" and as a "rotor magnetic field".

Below, this description is limited to rotary electric machines, so the term "electric machine" is used more simply to designate a rotary electric machine. Likewise, the term "electric motor" designates a rotary electric motor, and the term "generator" designates a rotary electricity generator.

The various electric machine technologies differ essentially in the way in which these stator and rotor magnetic fields are generated.

For example, in a DC electric motor, the stator has magnetic elements, that may be permanent magnets or non-permanent magnets, which are referred more commonly as electromagnets and which are constituted by one or more coils of electrical conductors powered by DC. The term "winding" is used below to designate a set of one or more electrical conductor coils. Whether permanent or non-permanent, each magnet has two poles, a north pole and a south pole, and as result a stationary stator magnetic field is created. In contrast, the rotor has non-permanent magnets that are constituted by a winding that creates a rotor magnetic field when it is passing DC. During rotation of the rotor, a rotary commutator serves, at least once per revolution, to reverse the direction of the DC passing through the rotor winding, thus reversing the poles of the non-permanent magnets of the rotor and thereby changing the direction of the rotor magnetic field.

Thus, a shift between the stator and rotor magnetic fields causes a magnetic torque to be applied to the rotor, for example, with a north pole of the stator repelling a north pole of the rotor, while attracting a south pole of the rotor. This causes the rotor to turn relative to the stator.

A main drawback of such a DC electric motor lies in the electrical contacts needed between the rotor winding and the rotary commutator. These contacts, which may be obtained by means of brushes, for example, can create electric arcs that lead in particular to wear and to interference that consequently require the electric machine to be maintained frequently. Furthermore, that type of electric motor is not suitable for high speed rotation and it consumes energy as a result of friction, thereby reducing its efficiency. Finally, it can be complex to make.

Those drawbacks are eliminated by the technology of so-called "brushless" motors.

The rotor of such an electric machine has one or more permanent magnets, while the stator has a winding constituting non-permanent magnets. Such a machine may also have means for determining the position of the rotor, e.g. by using a sensor, together with an electronic control system for switching electric current. An alternating electric current is thus passed through the stator winding. As a result, the electronic control system can determine the orientation and the direction of the stator magnetic field relative to the rotor magnetic field, and can consequently cause the rotor to rotate relative to the stator, with the rotating stator field entraining the rotor field.

Furthermore, within the stator winding, one or more coils may be grouped together in order to form different phases of the stator, each phase having the same shift relative to the other phases. In motor mode, each phase is powered by one of the phases of polyphase AC and generates a respective stator magnetic field, each stator magnetic field associated with any one phase being likewise shifted relative to the other stator magnetic fields associated with the other phases. When the stator magnetic fields are derived from the same polyphase AC in a balanced electrical system, they act together to form a single stator magnetic field referred to as the stator resultant field. By interacting with the rotor field, this stator resultant field can generate torque, and consequently can cause the rotor to rotate relative to the stator.

Likewise, in generator mode, rotation of the rotor causes the rotor field to rotate and causes a rotating stator resultant field to appear, which can be resolved into one magnetic field for each phase of the stator, thereby causing polyphase AC to appear.

AC electric machines include both synchronous electric machines and asynchronous electric machines.

Synchronous electric machines, which include brushless motors, have a rotor made up of one or more permanent magnets and a stator having a winding with a plurality of coils capable of forming one or more phases. When the coils of the stator winding are passing one or more alternating currents of a balanced polyphase electrical system, they create one or more stator magnetic fields that may be rotating, producing a stator resultant field that interacts with the rotor magnetic field at the synchronous frequency of the machine, thereby generating torque for rotating the rotor relative to the stator.

Conversely, when the rotor is rotated by external mechanical power, that causes the rotor magnetic field to rotate, thereby causing one or more alternating electric currents to appear and flow in the stator winding, and consequently creating one or more magnetic fields.

The permanent magnets of the rotor may be replaced by a winding that is powered by DC, thereby constituting non-permanent magnets, and thus creating a rotor magnetic field. The DC may be delivered by a current source such as a battery or a capacitor.

The frequency of rotation of the rotor of a synchronous electric machine is proportional to the frequency of the AC applied to the stator. Likewise, the frequency of the AC generated in a synchronous generator is proportional to the frequency of rotation of the rotor. A synchronous machine is often used as a generator, e.g. as an alternator in power stations.

Asynchronous electric machines have a rotor with a winding having coils that may be short circuited, for example, and a stator with a winding constituting non-permanent magnets. When the stator winding is passing AC, it creates one or more stator magnetic fields that may be rotating and that provide a stator resultant field that causes electric current to appear in the rotor winding, thereby generating a magnetic torque on the rotor and consequently causing the rotor to rotate relative to the stator.

Conversely, rotation of the rotor generated by external mechanical power causes AC to appear and flow in the winding of the stator. For this purpose, it is necessary to connect the electric machine to a power supply, e.g. including at least one converter and a battery, in order to supply it with the reactive energy it needs in order to operate in generator mode.

Although the frequency of rotation of the stator magnetic field is proportional to the frequency of the AC passing through the stator winding, the frequency of rotation of the rotor of an asynchronous electric machine is generally not proportional to this frequency of the AC, and a slip speed appears between the rotor and the stator magnetic field. Likewise, the frequency of the AC generated in an asynchronous generator is not necessarily proportional to the frequency of rotation of the rotor.

For a long time, asynchronous machines were used only as electric motors, e.g. in transport for the purpose of propelling ships and trains, and also in industry for machine tools. But nowadays, by using power electronics, such electric machines are also used as generators, e.g. in wind turbines.

Furthermore, the use of such reversible electric machines on board vehicles, such as cars or rotary wing aircraft, is becoming more widespread in order to provide a hybrid power plant that makes use of two types of energy for propelling the vehicle, both thermal energy and electrical energy. Nevertheless, such use is presently limited by certain constraints, such as the power-to-weight ratio of such electric machines and of electrical energy storage means.

Whatever the type of a reversible electric machine, a magnetic flux circulates between the rotor and the stator through the various permanent or non-permanent magnets of the rotor and of the stator, the flux being directed by the magnetic poles of the magnets. Specifically, such a magnetic flux generally circulates from a north pole towards a south pole through an airgap situated between each pole of the stator and the rotor, and also between a south pole and a north pole of the stator and of the rotor.

Furthermore, the magnets of the rotor, whether permanent or non-permanent, can be directed in two different ways leading to at least three types of electric machine.

Firstly, the magnets may be directed perpendicularly to the axis of rotation of the electric machine, i.e. the two poles of each magnet lie on a direction that is perpendicular to the axis of rotation. The magnets are then said to be radially oriented or more simply the magnets are said to be radial. An axial magnetic flux is then created in the airgap of the electric machine, i.e. parallel to its axis of rotation. The machine is then said to be an "axial" electric machine.

Secondly, the magnets may be directed parallel to the axis of rotation of the electric machine, i.e. the two poles of each magnet are directed parallel to the axis of rotation. It is then said that these magnets are axially oriented, or more simply that these magnets are axial. A radial magnetic flux is then created in the airgap, i.e. perpendicularly to the axis of rotation. Such a machine is said to be a "radial" electric machine.

These various orientations of the magnets serve to direct the magnetic flux circulating in the electric machine, which may then be axial, in a first type of electric machine, e.g. electric machines having a disk rotor, or radial in a second type of electric machine, e.g. electric machines having a cylindrical rotor. In a third type of electric machine, it is also possible to use both radial and axial magnets within the same electric machine such that magnetic flux is created both axially and radially. Such magnetic flux is then said to be "multiple-airgap" magnetic flux.

Furthermore, the term "homopolar machine" is also used to designate an electric machine in which the magnetic flux passes at least locally in an axial direction.

Nowadays, electric machines use a variety of configurations and orientations for magnetic flux in order to satisfy customer needs better, both in terms of performance and in terms of dimensions. For example, permanent magnetic machines with axial flux and high torque are axially shorter and radially larger, whereas radial magnetic flux machines are smaller radially and longer axially.

Furthermore, the power-to-weight ratio of such electric machines, i.e. their power divided by their weight, and also their cost of fabrication, varies depending on the magnetic flux configurations used.

Homopolar and transverse flux electric machines with permanent magnets are nowadays preferred because of high magnetic torque, due in particular to using permanent magnets, and due to a high performance-to-cost ratio compared with other machine technologies.

Nevertheless, the use of permanent magnets involves several drawbacks, in particular demagnetization of the permanent magnets at high temperature, thereby narrowing the range of applications in which such electric machines can be used. Furthermore, permanent magnets give rise to resisting torque in the generator function, thereby reducing the efficiency of the electric machine. In addition, the use of permanent magnets requires a generator electric machine to be regulated using high power electronics in order to take account of the impossibility of de-exciting the permanent magnet of such an electric machine, and such electronics can lead to problems of safety. However, a machine with winding excitation is regulated very simply and does not require high power electronics.

Furthermore, a short circuit on one of the stator phases of such an electric machine with permanent magnets can lead to a high level of resisting torque that can lead to consequences that are severe, and possibly to operation of the machine being blocked. Other major risks exist, such as breakdown of the power electronics when subjected to excess voltage, or such as a fire starting in the event of a short circuit.

Finally, permanent magnets, when they are fabricated using rare earths, are expensive, and may even become unavailable in the not so distant future.

Homopolar and transverse flux electric machines without permanent magnets, such as those described in Document FR 2 969 409, avoid some of those constraints associated with permanent magnets, but they do not make it possible to achieve equivalent performance. The rotor of such an electric machine includes strips of ferromagnetic material that are magnetized by a rotor exciter winding, also referred to as a "primary magnetic circuit" that is positioned on the stator of the electric machine. The primary magnetic circuit is powered by DC and thus generates constant rotor magnetic flux. Such an electric machine is referred to as a "separately excited electric machine". The stator of the separately excited electric machine also has two stator exciter windings, referred to as "secondary magnetic circuits", and two yokes having teeth surrounding each secondary magnetic circuit. The secondary magnetic circuits are powered with AC and thus generate stator magnetic flux, with electricity flowing in opposite directions in the two secondary magnetic circuits. Furthermore, these secondary magnetic circuits lie on either side of the primary magnetic circuit, i.e. one secondary magnetic circuit is positioned on each side of the primary magnetic circuit. As a result, the rotor is caused to rotate by interaction between the rotor and stator fluxes, each strip being simultaneously magnetically attracted by a tooth of a yoke of one secondary magnetic circuit and magnetically repelled by another tooth of a yoke of the other secondary magnetic circuit, the electric currents that flow in the two secondary magnetic circuits flowing in opposite directions.

Nevertheless, that machine requires two secondary magnetic circuits in order to operate and a number of poles on the strips of the rotor that is equal to the number of pairs of teeth on each secondary magnetic circuit. As a result, the number of strips of the rotor is half the number of teeth of each secondary magnetic circuit, so the torque supplied by that electric machine is half the torque supplied by an electric machine of identical size having permanent magnets on the rotor. Furthermore, the weight of such an electric machine is increased by the use of three windings, namely two secondary windings and one primary winding, the winding of the primary magnetic circuit generally being heavier than the windings of the secondary magnetic circuits. Thus, the drawbacks associated with using permanent magnets can be eliminated using such a separately excited electric machine, but to the detriment of the performance of that electric machine.

Furthermore, the technological background of the invention includes the following documents: U.S. Pat. No. 2,417,880 and GB 917 263.

BRIEF SUMMARY OF THE INVENTION

An object of the present invention is thus to propose an electric machine capable of overcoming the limitations associated with using permanent magnets, while conserving high performance.

Another object of the present invention is to propose an electric machine that is reliable, safe, and robust, while reducing its costs, its dimensions, and its weight.

An object of the present invention is thus to provide a separately excited electric machine capable of having performance that is at least as good as that of permanent magnet electric machines, and of dimensions that are equivalent, but without using permanent magnets.

According to the invention, a separately excited electric machine has an axis of rotation, a stator provided with a structural member and a plurality of windings, together with a rotor suitable for rotating about the axis of rotation and provided with a structure and a plurality of strips. The strips are distributed angularly in regular manner around the axis of rotation. Each winding is of annular shape around the axis of rotation of the electric machine.

The rotor may be internal and/or external relative to the stator, i.e. the rotor may be rotatable inside or outside the stator, or indeed an internal portion of the rotor may be rotatable inside the stator and an external portion of the same rotor may be rotatable outside the stator.

The separately excited electric machine of the invention is remarkable in that it includes at least one exciter unit formed by one primary magnetic circuit and two secondary magnetic circuits, with both secondary magnetic circuits co-operating simultaneously with the primary magnetic circuit.

A primary magnetic circuit comprises a rotor exciter winding of annular shape around the axis of rotation of the electric machine.

Each secondary magnetic circuit comprises a stator exciter winding of annular shape around the axis of rotation of the electric machine and two yokes that are likewise of annular shape. Each yoke has a C-shaped section, comprising three flanks, namely two extreme flanks and a central flank. As a result, each yoke surrounds a stator exciter winding that is then positioned inside two yokes. Furthermore, each yoke has a plurality of teeth over at least one extreme flank, each tooth having a base and a tip.

The terms "primary winding" and "secondary winding" are used below to designate respectively a rotor exciter winding and a stator exciter winding.

The teeth are distributed angularly in regular manner around the axis of rotation, with the base of each tooth being connected to the central flank. The teeth of the two yokes of a secondary magnetic circuit interfit in one another over at least one face of the secondary winding of this secondary magnetic circuit, while maintaining a first distance between them. These teeth are positioned facing the strips. This first distance is sufficient to maintain magnetic isolation between the teeth so as to avoid a magnetic short circuit between the teeth. This first distance serves to limit, or to even eliminate, magnetic flux leakage via the teeth. The first distance is preferably constant and identical for each secondary magnetic circuit.

Within an exciter unit, a tooth of a yoke of a first secondary magnetic circuit is "collinear" with a tooth of a yoke of the second secondary magnetic circuit of the exciter unit. Teeth are said to be "collinear" when the teeth have their bases and their tips oriented in the same direction. The tips and the bases of two such teeth are thus in alignment. Furthermore, the tips of these two teeth point in the same direction, i.e. so that the base of a single one of these two teeth lies between the tips of these collinear teeth. As a result, two teeth are to be found simultaneously facing a strip of the rotor. In addition, each strip may have dimensions enabling each strip to face the total surface area of two collinear teeth. Nevertheless, the use of strips presenting an area that does not completely cover the total area of two collinear teeth can be used to reduce the magnetic flux that circulates in the electric machine.

In addition, the tip of each tooth projects from the face of the winding of the secondary magnetic circuit while the central flank of each yoke does not project from the winding of the secondary magnetic circuit. The end of the tip of one tooth of a yoke of a secondary magnetic circuit is thus in alignment with the outside face of the central flank of the other yoke of the same secondary magnetic circuit. As a result, the tip of each tooth lies between a strip of the rotor and a central flank, thereby serving to guarantee that magnetic flux circulating between the rotor and the stator circulates preferably between a strip and the tooth, and not directly between a strip and the central flank. The tip of a tooth of one yoke of a secondary magnetic circuit lies at a second distance from the central flank of the other yoke of the same secondary magnetic circuit. This second distance is preferably constant and identical for each secondary magnetic circuit.

Furthermore, the first distance and the second distance are preferably equal. Nevertheless, the first distance may be slightly greater than the second distance.

The yokes of an exciter unit all have the same number of teeth. Furthermore, the total number of teeth of a secondary magnetic circuit of an exciter unit is equal to the total number of strips with which the exciter unit co-operates. Thus, each tooth of the exciter unit can co-operate simultaneously with one strip, each strip co-operating simultaneously with two teeth of the exciter unit. As a result, the number of first poles of the strips of the electric machine is equal to the number of second poles of the teeth of the electric machine.

Airgaps are thus formed between the strips and the teeth of the secondary magnetic circuits, with the heights of these airgaps being equal to a third distance.

The first and second distances are generally greater than the third distance so that a magnetic flux circulates between a tooth and a strip via the airgap and not via a tooth and a central flank of two yokes of a secondary magnetic circuit, nor via two teeth of these two yokes.

In addition, the first distance is preferably greater than or equal to the width of each strip so as to avoid a magnetic short circuit between a strip and two teeth. Specifically, under such circumstances, some or all of a magnetic flux circulating between a tooth and a strip across an airgap can jump directly to another tooth instead of passing via the strip.

More precisely, if the first distance is equal to the width of each strip, the corners of each strip and/or of each tooth need to be rounded in order to provide sufficient distance between a strip and a tooth to avoid such a magnetic short circuit. Likewise, the first distance must be strictly greater than the width of each strip when the corners of the strips and of the teeth are not rounded.

The yokes and also the strips of the rotor are made of ferromagnetic material suitable for conveying a magnetic flux. The strips, which pass a magnetic flux of sign that is constant and which are consequently subjected to eddy current losses that can be small, are made of laminations or indeed out of soft iron powder that is pressed and baked and/or machined. These laminations are generally made of a material also known as "electrical steel" even though it is often an alloy of iron and silicon, iron and nickel, or indeed iron and cobalt, whereas the soft iron powder that is pressed and baked and/or machined is known as soft magnetic compound (SMC).

Furthermore, the yokes surround the secondary windings and are thus subjected to varying magnetic fields. Specifically, the yokes should preferably be made out of a material that serves to reduce eddy current losses. For example, the yokes may be made from soft iron powder that has been pressed and baked and/or machined. They may also be made from stacked steel laminations or indeed from an assembly of steel parts.

The structural member of the stator and the structure of the rotor are made of non-magnetic material, such as for example aluminum, glass or carbon fiber, resin, plastics material, or indeed non-magnetic steel, e.g. austenitic steel. Such materials do not conduct magnetic flux and thus avoid having magnetic flux short circuits, and consequently magnetic leaks. Each strip is thus magnetically isolated from the other strips.

The strips of the rotor and the extreme flanks of each yoke, which are positioned parallel to the axis of rotation of the electric machine, thus enable radial magnetic fluxes to circulate across the airgap. The electric machine of the invention is thus a separately excited radial electric machine.

Nevertheless, the strips and the extreme flanks may be positioned perpendicularly to the axis of rotation, thus enabling axial magnetic fluxes to circulate across the airgap. The electric machine of the invention is then a separately excited axial electric machine.

When the rotor is solely internal or external relative to the stator, the teeth are distributed over a single extreme flank of each yoke, and the teeth face the rotor. In order to ensure magnetic continuity between the yokes, the extreme flank of each yoke that is remote from the teeth is such that the two yokes of a secondary magnetic circuit are in contact via these extreme flanks that are remote from the teeth. In addition, in order to ensure magnetic continuity between the two secondary magnetic circuits of an exciter unit, the primary magnetic circuit has a ring. This ring is in the form of an annulus positioned on the face of the primary winding that faces away from the strips of the rotor. The ring is in contact with a yoke of each secondary magnetic circuit of the exciter unit in order to guarantee magnetic continuity between the two secondary magnetic circuits and enable magnetic fluxes to circulate around loops, firstly around one of the secondary magnetic circuits and the primary magnetic circuit, and secondly around both of the secondary magnetic circuits of the exciter unit. The primary magnetic circuit is then constituted by the primary winding and the ring.

The ring is made of ferromagnetic material in order to provide this magnetic continuity. By way of example, the ring is made of wound laminations or indeed of soft iron powder that is pressed and baked and/or machined.

For a rotor that is solely internal or external, the two secondary magnetic circuits are positioned on either side of the primary magnetic circuit in an exciter unit, with the primary and secondary magnetic circuits being in alignment parallel to the strips of the rotor. Each strip of the rotor thus faces all of the exciter units, i.e. both secondary magnetic circuits and the primary magnetic circuit. The primary winding is then boxed in firstly by two yokes on two parallel faces, and secondly by the ring on a face remote from the strips of the rotor. The ring then comprises a single flank and is parallel to the strips of the rotor and to the teeth.

This architecture for the exciter unit makes it possible to have a radial electric machine that is of small diameter or an axial electric machine that is narrow.

In a variant of the invention, the two secondary magnetic circuits of an exciter unit may be positioned side by side, with a fourth distance lying between them in order to guarantee they are magnetically isolated from each other. The two secondary magnetic circuits are in alignment parallel with the strips of the rotor. The primary magnetic circuit is then positioned along both secondary magnetic circuits, over the face of each secondary magnetic circuit that faces away from the strips of the rotor. The ring surrounds the primary winding and is in contact with one of the yokes of each of the secondary magnetic circuits in order to guarantee magnetic continuity. The ring then has at least three flanks. The primary winding is then boxed in firstly by the ring and secondly by two yokes of two secondary magnetic circuits of the exciter unit.

The architecture of an exciter unit in this variant of the invention enables the dimensions of the electric machine to be modified and more particularly makes it possible to modify the ratio between the diameter and the width of the electric machine. It makes it possible to have an axial electric machine that is narrower, but of larger diameter, or else a radial electric machine of diameter that is smaller, but of greater width.

In contrast, when the rotor has both an internal portion and an external portion relative to the stator, the teeth are distributed over two first extreme flanks of each yoke, the two first extreme flanks respectively facing the internal portion and the external portion of the rotor. Under such circumstances, magnetic fluxes can circulate around a loop firstly around one of the secondary magnetic circuit and the primary magnetic circuit, and secondly around both of the secondary magnetic circuits of the exciter unit by passing via the strips that are situated on the internal and external portions of the rotor, and through airgaps between each strip and each tooth. There is no need for a ring when the exciter unit co-operates with an internal portion and with an external portion of the rotor. The primary magnetic circuit is then constituted solely by the primary winding.

For an internal and external rotor, the two secondary magnetic circuits are positioned on either side of the primary magnetic circuit in an exciter unit, with the magnetic circuits being in alignment parallel to the strips of the rotor. The primary magnetic circuit constituted by the single primary winding is then boxed in between two yokes on two parallel faces.

Preferably, the yokes are identical, regardless of the configuration of the rotor. As a result, fabrication costs for the yokes are reduced, as are fabrication and maintenance costs for the electric machine of the invention.

This selection between an axial electric machine or a radial electric machine has an impact on the dimensions of the machine, and it can thus be made, amongst other reasons, as a function of dimensional criteria for the electric machine. This selection may also have an impact on the inertia of the rotor, and consequently on the speeds of rotation of the electric machine.

Furthermore, each primary and secondary winding may be made up of one or more coils of electrical conductors. When a primary or secondary winding is passing electric current, whether DC or AC, a magnetic flux appears.

In particular, the primary winding passes DC, causing first magnetic fluxes F1 to appear. Thus, each first magnetic flux F1 circulates in a loop around the primary winding and passes through at least one strip and two yokes. Each primary magnetic flux F1 thus passes at least twice through an airgap between a strip and a tooth. As a result, each primary magnetic flux F1 can magnetize at least one strip, thereby causing a first north pole and a first south pole to appear on each strip through which it passes.

Furthermore, during rotation of the rotor, each strip is to be found in succession facing two collinear teeth, and it is thus magnetized in succession by means of a first flux F1 passing through these two teeth. Furthermore, since the primary winding passes a constant direct current, i.e. always flowing in the same direction, each pole of the strip is constant and always has the same polarity.

The secondary windings convey AC, causing second magnetic fluxes F2 to appear that circulate around the secondary windings. Both secondary windings of a single exciter unit pass the same AC, i.e. an electric current having the same magnitude and flowing in the same direction.

Thus, each second magnetic flux F2 circulates in a loop around a secondary winding and passes through at least one strip and the teeth of two yokes surrounding the secondary windings. Each second magnetic flux F2 thus passes at least twice through an airgap between a strip and a tooth.

Consequently, each second magnetic flux F2 can magnetize at least two teeth, causing a second north pole and a second south pole to appear respectively on at least two teeth. Consequently, the teeth of a given yoke present simultaneously second poles of the same polarity, two adjacent teeth of two yokes on either side of a secondary winding having second poles of opposite polarities.

In addition, since the current passed by the secondary winding is AC, the direction of each magnetic flux F2 reverses at the frequency of the AC, and consequently the polarity of each second pole is likewise reversed.

When the rotor is internal only or external only relative to the stator, the first and second magnetic fluxes F1, F2 cross two airgaps between the strips and the teeth, and respectively cause two first poles to appear on the strips and two second poles to appear on the teeth.

When the rotor is both internal and external relative to the stator, the first and second magnetic fluxes F1, F2 cross four airgaps between the strips and the teeth, and respectively cause four first poles to appear on the strips and four second poles to appear on the teeth.

In addition, two torques appear within the electric machine of the invention.

Firstly, a reluctant torque that is associated with the variation in the inductance of the magnetic circuit of the electric machine. This reluctant torque urges each strip of the rotor to occupy a position facing two collinear teeth. The mean value of this reluctant torque is zero and this reluctant torque is in particular zero when the strips are facing the teeth. This reluctant torque is always attractive, and in particular it is of zero value for a machine powered by currents that are symmetrical.

A synchronous torque also appears within the electric machine of the invention. This synchronous torque is associated with the interaction between the first and second magnetic fluxes F1, F2 generated by the primary and secondary magnetic circuits of each exciter unit. Specifically, these first and second magnetic fluxes F1, F2 use the same magnetic paths constituted by the yokes and the strips.

Consequently, these first and second magnetic fluxes F1, F2 are superposed and either add together or subtract, depending on their respective directions of circulation, with the reluctant torque and the synchronous torque then either adding together or subtracting.

Thus, when the first and second magnetic fluxes F1, F2 circulate in the same direction, the reluctant torque and the synchronous torque add together to form an attractive torque, the strips then being attracted by the teeth.

In contrast, when the first and second magnetic fluxes F1, F2 circulate in two opposite directions, the reluctant torque and the synchronous torque subtract so as to form a torque that may be attractive or indeed repulsive, or possibly zero. The strips may then be attracted or indeed repelled by the teeth, or possibly the strips are not subjected to any action by the teeth.

Advantageously, since the number of strips is equal to the number of teeth in a secondary magnetic circuit, the electric machine of the invention thus makes use of each tooth for setting the rotor into rotation, with each strip co-operating simultaneously with two collinear teeth. Consequently, the electric machine may supply torque to the rotor that is greater than the torque supplied by a prior art separately excited electric machine of equivalent dimensions. The increase in torque from the electric machine may be about 25%, for example. Furthermore, this torque on the rotor of the electric machine of the invention may approach, while nevertheless remaining less than, the torque from a conventional electric machine, i.e. a machine having permanent magnets or having a winding placed on the rotor, and of equivalent dimensions.

As a result, the electric machine of the invention makes it possible to make better use of the magnetic fluxes F1, F2 generated by the primary and secondary windings by making use of all of the first poles of the strips and of all of the second poles of the teeth, and possibly also using them in optimum manner via a rotor having an internal portion and an external portion.

In addition, when the rotor has an internal portion and an external portion relative to the stator, the teeth may be distributed in different manners respectively on the two extreme flanks of the yokes.

In a first yoke geometry, the teeth of both extreme flanks of a yoke are distributed angularly in regular manner around the axis of rotation, and they are positioned face to face on the two extreme flanks. Thus, the two extreme flanks may for example be of shapes that are equivalent to two in-phase signals.

In a second yoke geometry, the teeth of the two extreme flanks of a yoke are distributed in alternation on the two extreme flanks, each tooth of one extreme flank then being situated between two teeth of the other extreme flank of the same yoke. Thus, the two extreme flanks present shapes that are equivalent to two signals in phase opposition.

In addition to these two particular yoke geometries, the teeth of an extreme flank of a yoke may also occupy any position intermediate between a position facing a tooth of the other extreme flank and a position between two teeth of the other extreme flank, i.e. there may be an arbitrary offset between a tooth of one extreme flank and a tooth of the other extreme flank of the same yoke. However, the teeth must always have the same offset between one another on each of the extreme flanks, and they must also have the same shape and the same dimensions.

Thus, the large number of magnetic poles on the stator and the use of a primary winding positioned on the stator have the effect of increasing the performance of the electric machine of the invention while conserving dimensions that are identical to the dimensions of a conventional electric machine, while its rotating mass is smaller. The performance of such an electric machine is thus improved, in particular its torque, and likewise its power-to-weight ratio.

In order to further increase the performance of the electric machine of the invention, and in particular its torque, it is possible to use a plurality of exciter units, each constituted by one primary magnetic circuit and two secondary magnetic circuits, the rotor having a plurality of strips distributed angularly in the regular manner around the axis of rotation of the electric machine and co-operating with these exciter units.

These exciter units may be associated axially along the axis of rotation of the electric machine so that the exciter units form a line parallel to the axis of rotation. Likewise, the exciter units may be associated radially relative to the axis of rotation of the electric machine so that the exciter units form a line perpendicular to the axis of rotation. Finally, it is possible to combine these two ways of associating exciter units, e.g. having exciter units, each constituted by one primary magnetic circuit and two secondary magnetic circuits that are associated axially, and then by combining a plurality of associations of this type in radial manner, so that a plurality of series of strips then cooperate with these exciter units.

Unfortunately, it can happen that magnetic leaks occur. These magnetic leaks then lead to a drop in the performance of the electric machine, in particular of its torque.

In order to avoid magnetic leaks appearing between the exciter units made up of primary and secondary magnetic circuits, or indeed in the strips, or at least in order to limit such leaks, it is necessary to use a non-magnetic material, or indeed air, for example, for the purpose of magnetically isolating each group constituted by an exciter unit and by strips co-operating with the exciter unit. Using a non-magnetic material separating each exciter unit, or indeed the strips with which it cooperates, then suffices to isolate the magnetic fluxes F1, F2 circulating in such groups.

For example, a spacer may be positioned between two yokes of two adjacent secondary magnetic circuits, these two secondary magnetic circuits belonging to two different exciter units. By way of example, the spacer may be made of carbon fiber, of glass fiber, of aluminum, or of any other non-magnetic material. Under such circumstances, one strip of the rotor can cooperate with a plurality of exciter units, in which case it then has a plurality of first north poles and a plurality of first south poles.

Likewise, the strips of the rotor may be distributed in a plurality of strip series, each strip series having only one first north pole and only one first south pole, and co-operating with only one exciter unit. Two adjacent strip series are then magnetically isolated from each other by a separation made of non-magnetic material, e.g. by the structure of the rotor. Under such circumstances, two exciter units need not be magnetically isolated, it being possible, for example, for two yokes of two adjacent secondary magnetic circuits to be in contact, each yoke co-operating independently with a series of strips.

Furthermore, in order to reduce the dimensions of such an electric machine and thus the number of its components, and consequently its weight, it is possible to associate two adjacent secondary magnetic circuits. This makes it possible to optimize the power-to-weight ratio of the electric machine of the invention.

For example, two adjacent secondary magnetic circuits may share a common yoke, the rotor having a plurality of strip series that are magnetically isolated from one another. This yoke then separates the two secondary windings of these two adjacent secondary magnetic circuits. The yoke has two rows of teeth distributed on a single extreme flank, each row of teeth co-operating with a single secondary winding and with a single strip series. Two first magnetic fluxes F1 relating respectively to the two primary magnetic circuits with which these two adjacent secondary magnetic circuits cooperate, and two second magnetic fluxes F2 relating respectively to these two adjacent secondary magnetic circuits, then circulate independently in the yoke in order to cause the rotor to rotate.

These two rows of teeth may be distributed in different manners on the same extreme flank, in a manner analogous to the distribution of teeth on two extreme flanks when the rotor has both an internal portion and an external portion relative to the stator.

Thus, two teeth of two rows can be positioned facing each other on the same extreme flank, the two rows then being symmetrical in shape, or indeed each tooth of one row may be situated between two teeth of the other row on the same extreme flank. The teeth of one extreme flank of one yoke may also occupy any intermediate position between these two particular positions. However, these teeth must always have the same offset between one another on each extreme flank, and they must also have the same shape and the same dimensions.

In addition, in an electric machine of the invention that has a plurality of exciter units, the secondary windings may be powered with the same single phase AC in a motor mode of operation. Nevertheless, the secondary windings of one exciter unit may be powered by single phase AC in a direction that is opposite from the direction of the single phase AC powering the secondary windings of another exciter unit.

Advantageously, the electric machine may use single electronic power means for each of the exciter units, thereby sharing this electrical power supply stage.

Likewise, in a generator mode of operation, such an electric machine then supplies single phase AC, the primary winding of each exciter unit being powered with DC in order to cause the first north and south poles to appear on the strips of the rotor.

It is also possible to power the secondary windings of each exciter unit with different phases of balanced polyphase AC. Under such circumstances, each phase of the balanced polyphase AC needs to be shifted relative to the other phases of the polyphase AC and there also needs to exist a phase shift between the exciter units within the electric machine of the invention. In known manner, this phase shift between the exciter units is a function of the phase shift between the phases of the balanced polyphase AC and of the number of magnetic poles of the electric machine. Under such circumstances, it is also possible to shift only the secondary magnetic circuits of each exciter unit on the stator, the rotors being shared by means of strips that are common and very long.

Likewise, in a generator mode of operation, such an electric machine then supplies balanced polyphase AC, the primary winding of each exciter unit then being powered with DC in order to cause first north and south poles to appear on the strips of the rotor.

In order to optimize the performance of the electric machine of the invention, it is important to facilitate the circulation of the magnetic fluxes, both when crossing each of the airgaps and when circulating in the rotor and the stator.

The shape of each yoke is important in order to facilitate the circulation of these magnetic fluxes F1, F2.

Firstly, the teeth may be of various shapes, such as a triangle, a trapezoid, or a rectangle. The best shape that serves firstly to achieve good magnetization of the teeth in order to form the second magnetic poles and secondly to achieve a good transfer of magnetic flux across an airgap to the first magnetic poles, of the strips of the rotor, is a "wave" shape that corresponds to a regular sinewave. Nevertheless, this shape is difficult to make, particularly with a method in widespread use for fabricating parts of this type for electric machines, such as compacting iron powder. The crests of the waves then lack uniformity and their effectiveness is reduced.

The teeth preferably have a "cat's tongue" or a "staircase" shape that makes it possible to achieve a good compromise between the effectiveness of the shapes and fabricating them, in particular by compacting iron powder.

Thereafter, in order to achieve good circulation of the magnetic fluxes F1, F2 in each yoke, it is important to ensure there is no zone of magnetic flux saturation, in particular at the base of each tooth. For this purpose, it is possible to add connecting fillets to the bases of the teeth at the junction between each extreme flank and the central flank of each yoke, or else to modify the sections of the yoke in this zone. A chamfer connection is preferably provided at the base of each tooth.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 1 to 4 show various views of a first embodiment of the electric machine of the invention;

FIG. 5 shows shapes for teeth;

FIG. 6 shows yoke sections;

FIG. 9 shows a variant of the first embodiment;

FIGS. 10 to 13 show a third embodiment of the electric machine of the invention;

FIGS. 14 to 16 show the yokes of this third embodiment; and

FIGS. 17 to 21 show other embodiments of the electric machine of the invention.

DETAILED DESCRIPTION OF THE INVENTION

Figure 8:
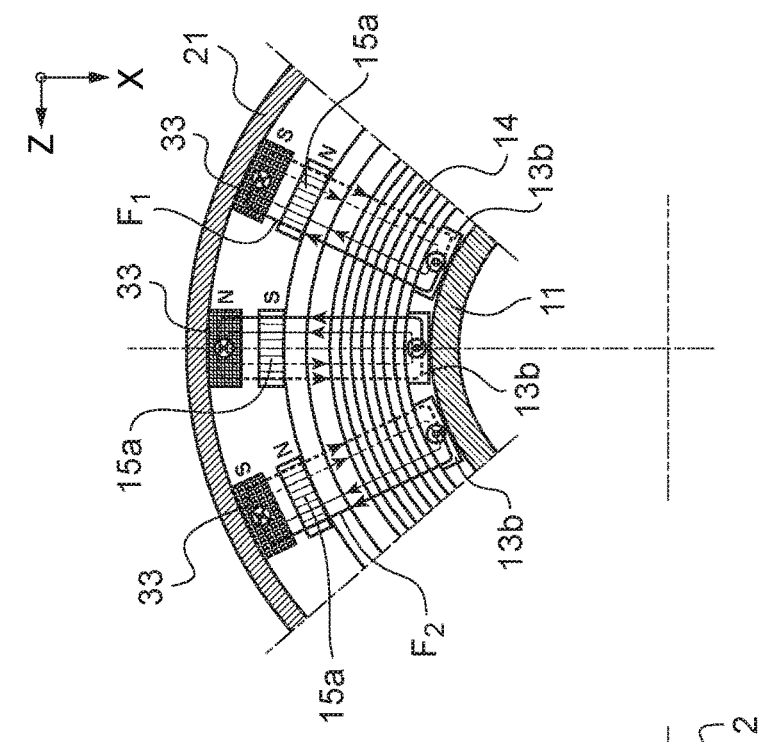
FIGS. 7 and 8 show a second embodiment of the electric machine of the invention.

Elements present in more than one of the figures are given the same references in each of them.

It should be observed that three mutually orthogonal directions X, Y, and Z are shown in some of the figures.

The direction Y is said to be axial. The term "axial" relates to any direction parallel to the direction Y.

The directions X and Z are said to be radial. The term "radial" relates to any direction perpendicular to the axial direction Y.

FIGS. 1 to 4 show a first embodiment of an electric machine 1 of the invention. In FIG. 1, such an electric machine 1 has an axis of rotation 2, a stator 10, and a rotor 20 that rotates about the axis of rotation 2 inside the stator 10.

The rotor 20 comprises a structure 21 with a plurality of strips 33 positioned parallel to the axis of rotation 2. The stator 10 comprises a structural member 11 and an annular exciter unit 3 having two secondary magnetic circuits 12, 12' and one primary magnetic circuit 22 placed between the two secondary magnetic circuits 12, 12'. The two secondary magnetic circuits 12, 12' and the primary magnetic circuit 22 are aligned parallel to the axis of rotation 2 and thus also parallel to the strips 33. The exciter unit 3 is thus parallel to the axis of rotation 2.

Each secondary magnetic circuit 12, 12' comprises a secondary winding 14, 14' and two yokes 13a & 13b, 13a' & 13b' that are annular and identical. Reference 13 is used below to designate a yoke in general manner, while the references 13a, 13b, 13a', 13b' are used to distinguish between the various yokes within an exciter unit 3. Various sections are shown in FIG. 6 for a yoke 13. Each yoke 13 has three flanks, comprising two extreme flanks 131, 132 and a central flank 133. In the same manner as for the yoke 13, the references 131, 132, and 133 are used below to designate the extreme and central flanks in general manner, while the references 131a, 131b, 131a', 131b' are used, by way of example, to identify an extreme flank of a respective one of the yokes 13a, 13b, 13a', 13b' within the exciter unit 3. Each secondary winding 14, 14' is thus positioned inside two yokes 13a, 13b, 13a', 13b' so as to form a secondary magnetic circuit 12, 12'. An extreme flank 131 has a plurality of teeth 15 that are distributed angularly in regular manner around the axis of rotation 2. These teeth 15 are positioned facing the strips 33 of the rotor 20.

In the same manner as for the yoke 13, and the extreme and central flanks 131, 132, and 133, the reference 15 is used below to designate a tooth in general manner, and the references 15a, 15b, 15a', 15b' are used to identify a tooth belonging respectively to these yokes 13a, 13b, 13a', 13b' within the exciter unit 3.

The teeth 15a, 15b of the two yokes 13a, 13b of a secondary magnetic circuit 12 engage mutually one in another on a face of the secondary winding 14, this face of the secondary winding 14 facing the strips 33. A first distance dl is maintained between two adjacent teeth 15a, 15b of two yokes 13a, 13b of a secondary magnetic circuit 12, as can be seen in FIGS. 2 and 3. This first distance d1 is constant and identical for both secondary magnetic circuits 12, 12' of the exciter unit 3. These two FIGS. 2 and 3 show respective sections A-A and B-B.

Each secondary tooth 15 has a base and a tip, the base connecting the tooth 15 to the central flank 133 of the yoke 13. Within the exciter unit 3, the tips and the bases of two teeth 15, 15' are aligned parallel to the axis of rotation, these two teeth 15, 15' belonging respectively to a yoke 13a, 13a' of each secondary magnetic circuit 12, 12' of the exciter unit 3. These two teeth 15, 15' are collinear and they face the same strip 33 of the rotor 20.

An airgap exists between each tooth 15 and a strip 33, with the height of the airgap being equal to a third distance d3, and each strip 33 co-operates simultaneously with two teeth 15, 15'.

As a result, the yokes 13a, 13b, 13a', 13b' of this exciter unit 3 have the same number of teeth 15a, 15b, 15a', 15b'.

Also, the total number of teeth 15 of a secondary magnetic circuit 12 in this exciter unit 3 is equal to the total number of strips 33 of the rotor 20.

Furthermore, for each secondary magnetic circuit 12, each tooth 15a of a yoke 13a projects beyond the face of the secondary winding 14 on which it is to be found, i.e. in such a manner that the end of the tip of each tooth 15a is in alignment with the outside face of the central flank 133b of the other yoke 13b of the secondary magnetic circuit 12. The tip of a tooth 15a of a yoke 13a of a secondary magnetic circuit 12 is thus at a second distance d2 from the central flank 133b of the other yoke 13b of the secondary magnetic circuit 12. This second distance d2 is preferably constant and identical for each secondary magnetic circuit 12.

Each primary magnetic circuit 22 has a primary winding 24 and a ring 23. The ring 23 is annular and has only one flank 231. The ring 23 is positioned on a face of the primary winding 24 that is opposite from the strips 33 of the rotor 20, i.e. on the external face of the primary winding 24, given that the rotor 20 is an internal rotor. Since the primary magnetic circuit 22 is boxed in by two secondary magnetic circuits 12, 12', the primary winding 24 is boxed in on one face by the ring 23 and on two other faces by one of the yokes 13b, 13a' of these two secondary magnetic circuits 12, 12'. Furthermore, the ring 23 of the primary magnetic circuit 22 is in contact with these yokes 13b, 13a' of these two secondary magnetic circuits 12, 12' on either side of the primary magnetic circuit 22.

The structural member 11 of the stator 10 and the structure 21 of the rotor 20 are made of non-magnetic material. By way of example, they may be of aluminum, of glass fiber or carbon fiber, of resin, or indeed of plastics material. The yokes 13, the ring 23, and the strips 33 are made of ferromagnetic material. The yokes 13 and the ring 23 may be held respectively around the secondary winding 14 and the primary winding 24 by a material that is not metallic and not magnetic, e.g. by a solid coating of carbon fibers. The strips 33 may also be fastened to the structure 21 by means of the same material.

The primary winding 24 is powered by DC and it thus generates a constant magnetic field. First magnetic fluxes F1 circulate in a loop around the primary winding 24 and they pass through the yokes 13, the ring 23, and the strips 33, thereby causing a first north pole and a first south pole to appear on each strip 33.

The two secondary windings 14, 14' of the exciter unit 3 are powered by the same AC and they thus generate an alternating magnetic field. Second magnetic fluxes F2 circulate in a loop around the secondary winding 14 and they pass through the yokes 13, the ring 23, and the strips 33, thereby causing second north poles and second south poles to appear on the teeth 15.

Thus, each strip 33 has two first poles and each tooth has one second pole. As a result, the number of first poles of the electric machine 1 is equal to its number of second poles.

More precisely, a first magnetic flux F1 passes firstly from a first tooth 15a of a first yoke 13a of the first secondary magnetic circuit 12 across a first airgap between the first tooth 15a and the strip 33, and then after traveling in the strip 33, the first magnetic flux F1 crosses a second airgap between the same strip 33 and a third tooth 15a' of a third yoke 13a' of the second secondary magnetic circuit 12'. The first and second teeth 15a and 15a' are collinear.

Thereafter, the first magnetic flux F1 circulates from the third tooth 15a' through the third central flank 133a' of this third yoke 13a' of the second secondary magnetic circuit 12', and then through the third extreme flank 132a' of the third yoke 13a', this third extreme flank 132a' being opposite from the third tooth 15a'. Thereafter, this first magnetic flux Fl circulates through the ring 23 prior to reaching and circulating through a second extreme flank 132b of the second yoke 13b of the first secondary magnetic circuit 12, this second extreme flank 132b being opposite from the first tooth 15a. Thereafter, the first magnetic flux F1 circulates through the first extreme flank 132a of the first yoke 13a, this first extreme flank 132a also being opposite from the first tooth 15a. Finally, this first magnetic flux F1 passes through the first central flank 133a of this first yoke 13a until it returns to the first tooth 15a, thereby closing this loop of the first magnetic flux F1. Thus, by passing through a single strip 33, each first magnetic flux F1 can cause a first north pole and a first south pole to appear on that strip 33.

Furthermore, a first magnetic flux F1 thus circulates through each of the strips 33 and two yokes 13a, 13b, 13a', 13b' having teeth 15a, 15b, 15a', 15b' that are collinear, and the ring 23, thereby enabling a first north pole and a first south pole to be caused to appear on each strip 33.

Likewise, a second magnetic flux F2 passes firstly from a first strip 33 across a first airgap between the first strip 33 and a first tooth 15a of a first yoke 13a of a first secondary magnetic circuit 12, and then passes from the first tooth 15a into the first central flank 133a, and then into the first extreme flank 132a of the first yoke 13a, this first extreme flank 132a being opposite from the first tooth 15a. The second magnetic flux F2 then circulates through the second extreme flank 132b of a second yoke 13b of the first secondary magnetic circuit 12, this second extreme flank 132b being opposite from the strips 33, prior to reaching and passing through the ring 23.

Thereafter, the second magnetic flux F2 circulates through the third extreme flank 132a' of a third yoke 13a' of the second secondary magnetic circuit 12', this third extreme flank 132a' being opposite from the strips 33. Thereafter, the second magnetic flux F2 passes through the third central flank 133a' of the third yoke 13a' until it reaches a third tooth 15a'. The second magnetic flux F2 then crosses a second airgap between this first tooth 15a' and the first strip 33 and then circulates in the first strip 33 in order to close this second loop of the second magnetic flux F2.

Thus, by passing through two collinear teeth 15, each second magnetic flux F2 can cause a second north pole and a second south pole to appear on the two teeth 15.

The second magnetic fluxes F2 are thus looped in the electric machine 1 as a whole, passing through all of the teeth 15 and the strips 33, so as to cause second north poles and second south poles to appear on the teeth 15. In addition, since the secondary windings 14, 14' are powered by AC, the flow direction of these secondary magnetic fluxes F2 changes at the frequency of this AC.

Consequently, these first magnetic fluxes F1 and these second magnetic fluxes F2 follow paths that are identical and they are superposed within the electric machine 1, either adding or subtracting depending on their directions. Consequently, a reluctant torque and a synchronous torque appear within the electric machine 1. These reluctant and synchronous torques can likewise either add or subtract, thus enabling the strips 33 either to be attracted to or repelled from the teeth 15, thus causing the rotor 20 to rotate relative to the stator 10.

In this first embodiment of the electric machine 1 of the invention, the strips 33 are parallel to the axis of rotation 2. Consequently, the airgap between the strips 33 and the teeth 15 are perpendicular to the axis of rotation 2, with the magnetic fluxes F1, F2 passing perpendicularly relative to the axis of rotation 2 in these airgaps, i.e. radially. The electric machine 1 in this first embodiment shown in FIGS. 1 to 4 is thus a radial electric machine.

An electric machine 1 of the invention could equally well be an axial electric machine, the strips 33 and the teeth 15 then being positioned perpendicularly to the axis of rotation 2, as is the exciter unit 3.

Furthermore, this first embodiment of the electric machine 1 of the invention has a rotor that is internal, i.e. the rotor 20 rotates inside the stator 10. The teeth 15 are then situated on the inside face of the secondary windings 14, 14'.

Figure 7:
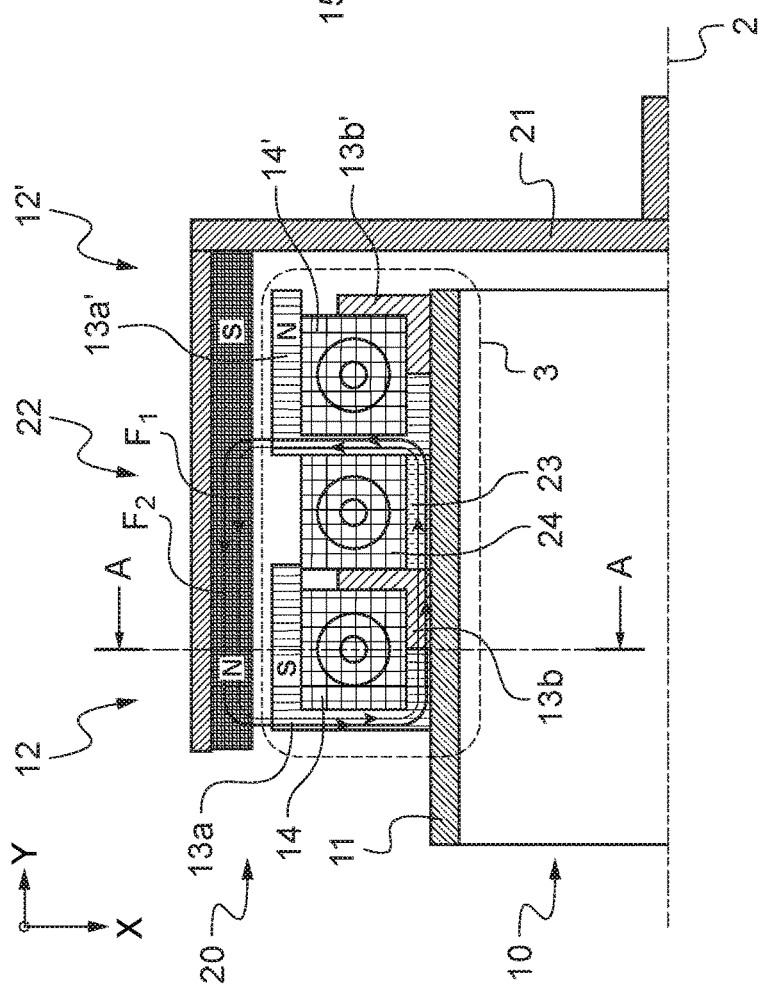
Figure 12:
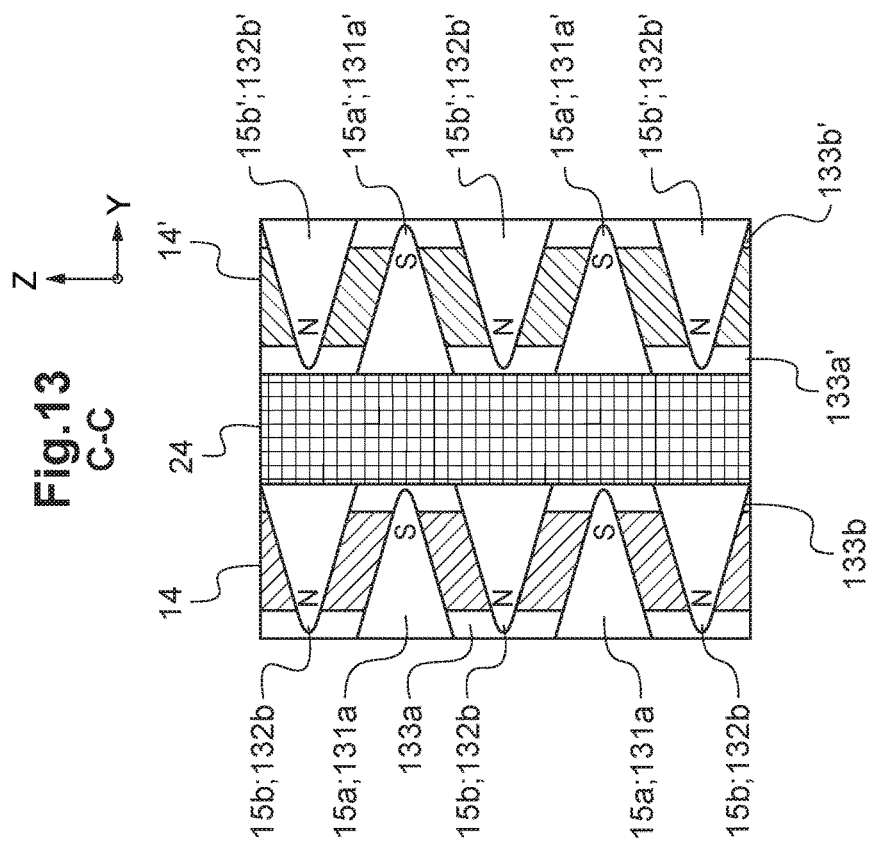
Figure 13:
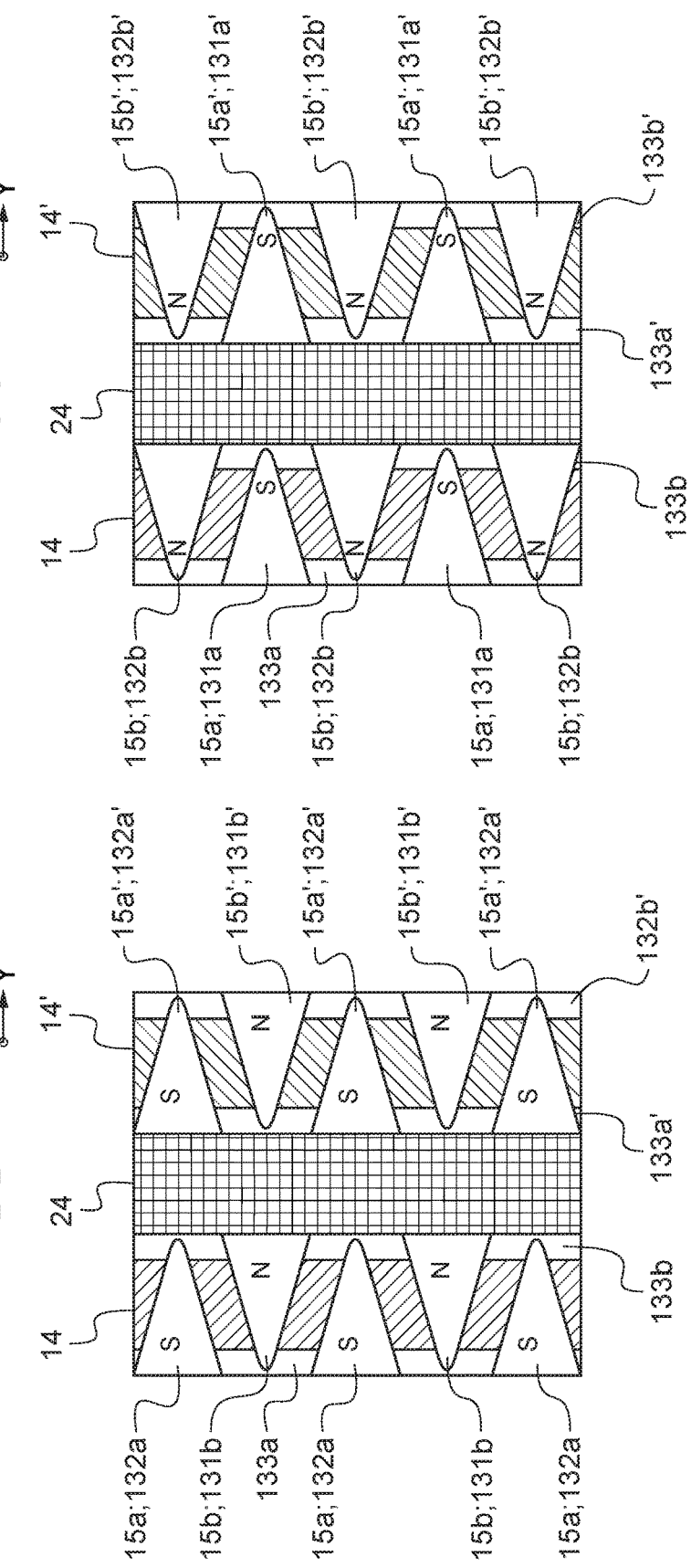

In a second embodiment of the electric machine 1 of the invention, as shown in FIGS. 7 and 8, the rotor 20 is external, i.e. the rotor 20 rotates outside the stator 10. The teeth 15 are situated on the external faces of the secondary windings 14, 14', and the ring 23 is situated on the internal face of the primary winding 24. The operation of this second embodiment of the electric machine 1 is analogous to the operation of the first embodiment, the magnetic fluxes F1, F2 passing in particular between the strips 33 and the teeth 15 and causing reluctant and synchronous torques to appear.

A variant of the first embodiment of the electric machine 1 is shown in FIG. 9. The two secondary magnetic circuits 12, 12' of the exciter unit 3 are positioned side by side and the primary magnetic circuit 22 is positioned along both secondary magnetic circuits 12, 12' on the face of each secondary magnetic circuit 12, 12' that is remote from the strips 33 of the rotor 10. This variant has a rotor that is internal, but it could equally well be implemented with a rotor 20 that is external.

A fourth distance d4 lies between the two secondary magnetic circuits 12, 12' in order to guarantee that they are magnetically isolated from each other. Both of these secondary magnetic circuits 12, 12' are aligned parallel to the strips 33 of the rotor 20 and parallel to the axis of rotation 2. This variant thus constitutes an electric machine 1 that is radial. Nevertheless, a variant of the first embodiment could equally well be an electric machine that is axial, with both secondary magnetic circuits 12, 12' and the strips 33 then being in alignment perpendicularly to the axis of rotation 2.

In this variant, the ring 23 has three flanks 231, 233, 233 and thus contains the primary winding 24. This ring 23 is in contact with a yoke 13 of each secondary magnetic circuit 12, 12' in order to guarantee magnetic continuity. This ring 23 then has at least three flanks.

The operation of this variant is substantially analogous to the operation of the first embodiment of the electric machine 1 of the invention, as are the paths followed by the magnetic fluxes F1, F2.

In particular, the first magnetic flux F1 passes initially from a first tooth 15a of a first yoke 13a of the first secondary magnetic circuit 12 across a first airgap between the first tooth 15a and the strip 33, and then after circulating in the strip 33, this first magnetic flux F1 crosses a second airgap between the same strip 33 and a third tooth 15a' of a third yoke 13a' of the second secondary magnetic circuit 12'. The first and third teeth 15a, 15a' are collinear.

Thereafter, the first magnetic flux F1 circulates from the third tooth 15a' through the third central flank 133a' of the third yoke 13a' of the second secondary magnetic circuit 12', and then through the third extreme flank 132a' of the third yoke 13a'. Prior to circulating in the ring 23, and contrary to the first embodiment, this first magnetic flux F1 circulates in the fourth extreme flank 132b' of the fourth yoke 13b'. Thereafter, the first magnetic flux F1 passes through the ring 23 and then reaches directly the first extreme flank 132a of the first yoke 13a. Finally, this first magnetic flux F1 passes through the first central flank 133a of the first yoke 13a until it returns to the first tooth 15a so as to close this loop for the first magnetic flux F1.

Likewise, the second magnetic flux F2 passes initially from a first strip 33 across a first airgap between the first strip 33 and a first tooth 15a of a first yoke 13a of a first secondary magnetic circuit 12, and then circulates from the first tooth 15a into the first central flank 133a and then into the first extreme flank 132a. This second magnetic flux F2 then passes directly through the ring 23 and then circulates in the fourth extreme flank 132b' of the fourth yoke 13b' of the second secondary magnetic circuit 12'. The second magnetic flux F2 then passes through the third extreme flank 132a' of a third yoke 13a' of the second secondary magnetic circuit 12', and then through the third central flank 133a' of the third yoke 13a' until it reaches a third tooth 15a'. Finally, the second magnetic flux F2 crosses a second airgap between the third tooth 15a' and the first strip 33 and circulates in the first strip 33 in order to close the loop for the second magnetic flux F2.

The first and second embodiments of an electric machine 1 of the invention include a rotor 20 that may either be internal or external. Nevertheless, in a third embodiment of the electric machine 1, as shown in FIGS. 10 to 13, it is possible to use a rotor 20 that has both an internal portion and an external portion. The structure 21 of the rotor 20 of such an electric machine 1 has an internal portion 21a and an external portion 21b on which strips 33 are positioned. The yokes 13 comprise two series of teeth 15 distributed on the two extreme flanks 131, 132 of each yoke 13 facing the strips 33 positioned respectively on the internal portion 21a and on the external portion 21b of the structure 21 of the rotor 20.

The exciter unit 3 of this electric machine 1 has two secondary magnetic circuits 12, 12', each provided with a respective secondary winding 14, 14', and two yokes 13a, 13b, 13a', 13b' and a primary magnetic circuit 22, these two secondary magnetic circuits 12, 12' being on either side of the primary magnetic circuit 22. The primary magnetic circuit 22 does not have a ring 23 and it is constituted solely by the primary winding 24. It is nevertheless possible for the first and second magnetic fluxes F1 and F2 to be looped firstly because of the strips 33 that are present on either side of the exciter unit 3 and that are situated on the internal and external portions 21a and 21b of the rotor 20, and secondly because of the teeth 15 facing these strips 33.

More precisely, a first magnetic flux F1 initially passes from a first tooth 15a of a first yoke 13a of the first secondary magnetic circuit 12 across a first airgap between the first tooth 15a and a first strip 33 situated on the internal portion 21a, and then after circulating in the first strip 33, this first magnetic flux F1 crosses a second airgap between the first strip 33 and a third tooth 15a' of a third yoke 13a' of the second secondary magnetic circuit 12'. The first tooth 15a and the third tooth 15a' are collinear.

Thereafter, the first magnetic flux F1 circulates from the third tooth 15a' through the third central flank 133a' of the third yoke 13a', and then in another third tooth 15a' of the third yoke 13a', this other third tooth 15a' being situated on the third external flank 132a' opposite from the third tooth 15a'.

Thereafter, this first magnetic flux F1 crosses a third airgap between this other third tooth 15a' and a second strip 33 situated on the external portion 21b. After circulating in this second strip 33, this first magnetic flux F1 crosses a fourth airgap between this second strip 33 and another first tooth 15a of the first yoke 13a. This other first tooth 15a is situated on the first extreme flank 132a opposite from the first tooth 15a and is collinear with the other third tooth 15a'.

Finally, this first magnetic flux F1 passes along the first central flank 133a of the first yoke 13a until it returns to the first tooth 15a, thereby closing this loop for the first magnetic flux F1. Thus, by passing through two strips 33 situated respectively on the internal portion 21a and on the external portion 21b of the structure 21 of the rotor 20, each magnetic flux F1 can cause a first north pole and a first south pole to appear on the strips 33 both on the internal portion 21a and on the external portion 21b of the structure 21 of the rotor 20.

Likewise, each second magnetic flux F2 circulates in a loop in a manner analogous to each first magnetic flux F1 around each secondary winding 14, 14', passing along the strips 33 and the yokes 13.

In this third embodiment of an electric machine 1 of the invention, the teeth 15 are distributed on the two extreme flanks 131, 132 of a yoke 13. Each tooth 15 of an extreme flank 131 of a yoke 13 may be situated facing a tooth 15 of the other extreme flank 132 of the same yoke 13 in a first shape for the yoke 13.

The two extreme flanks 131, 132 may for example have shapes equivalent to two in-phase signals, as shown in FIG. 14, this yoke 13 being drawn as though it is straight, even though it is actually annular in shape.

In another embodiment of a secondary magnetic circuit 12, shown in an exploded view in FIG. 15, the two yokes 13a, 13b having this first shape have two teeth 15a, 15b surrounding a secondary winding 14. These teeth 15a, 15b are rectangular in shape.

Nevertheless, these teeth 15 could be distributed in some other way between the two extreme flanks 131, 132, however these teeth 15 must always have the same angular distribution around the axis of rotation 2 of the rotor 20 over each extreme flank 131, 132 of each yoke 13, and also the same shapes and the same dimensions.

By way of example, each tooth 15a, 15b of an extreme flank 131a, 131b of a yoke 13a, 13b is situated between two teeth 15a, 15b of the other extreme flank 132a, 132b of the same yoke 13a, 13b in a second shape for the yoke 13a, 13b. The two extreme flanks 131a, 131b, 132a, 132b may for example have shapes that are equivalent to two signals that are in phase opposition, as shown in FIG. 16. FIG. 16 shows the two yokes 13a, 13b having teeth 15a, 15b that interfit mutually on the faces of a secondary winding 14 that is not shown, these yokes 13a, 13b likewise being shown as being straight even though in fact they are annular in shape.

The teeth 15 of an extreme flank 131 of a yoke 13 may also occupy any intermediate position between a position facing a tooth 15 of the other extreme flank 132 of the same yoke 13 and a position between two teeth 15 of this other extreme flank 132.

In addition, the teeth 15 may be of various shapes, some examples of which are shown in FIG. 5, in particular in order to provide good circulation for the magnetic fluxes F1 and F2. These various shapes may include either sharp edges or else radii of curvature. The optimum shape for these teeth 15 is a "wave" corresponding to a regular sinewave in FIG. 5a, however this optimum shape is difficult to make industrially. The teeth 15 preferably have a "cat's-tongue" shape or a "staircase" shape, as shown respectively in FIG. 5b and in FIG. 5c, which make it possible to achieve a good compromise between the effectiveness of these shapes and ease of fabricating them, in particular by compacting iron powder.

Furthermore, in order to enable the magnetic fluxes F1 and F2 to circulate well in the stator 10, and more particularly in each of the yokes 13, the section of the yoke 13 at the junction between each extreme flank 131, 132 and the central flank 133 needs to be defined with care. An inappropriate shape could lead to the magnetic flux F1, F2 saturating in the yoke 13 and consequently to a loss of performance of the electric machine 1. Examples of such sections for the yoke 13 are shown in FIG. 6, with the preferred section for the yoke 13 being a connection via a chamfer as shown in FIG. 6a.

In order to increase the performance of the electric machine 1 of the invention, and in particular in order to increase its torque, it is possible to use a plurality of exciter units 3, each exciter unit 3 being made up of two secondary magnetic circuits 12, 12' and a primary magnetic circuit 22, the rotor 20 having a plurality of strips 33 distributed angularly in regular manner around the axis of rotation 2 of the electric machine 1 and co-operating with these exciter units 3.

These exciter units 3 may be associated axially relative to the axis of rotation 2 of the electric machine 1 so that the exciter units 3 form a line parallel to the axis of rotation 2, as for the electric machines 1 shown in FIGS. 17 to 21. Likewise, it is possible to associate these exciter units 3 in radial manner relative to the axis of rotation 2 of the electric machine 1, or indeed to combine both association options, e.g. obtaining exciter units 3 that are associated axially and then combining a plurality of associations of this type radially.

Within such electric machines 1, e.g. having three exciter units 3a, 3b, 3c, the exciter units 3a, 3b, 3c are magnetically isolated from one another by means of a spacer 31 made of non-magnetic material. This spacer 31 thus serves to isolate the magnetic fluxes F1, F2 circulating in each of the exciter units 3a, 3b, 3c and to avoid magnetic leaks appearing between these exciter units 3a, 3b, 3c. The spacer 31 is positioned between two yokes 13a, 13b' of two adjacent secondary magnetic circuits 12, 12'.

Figure 17:
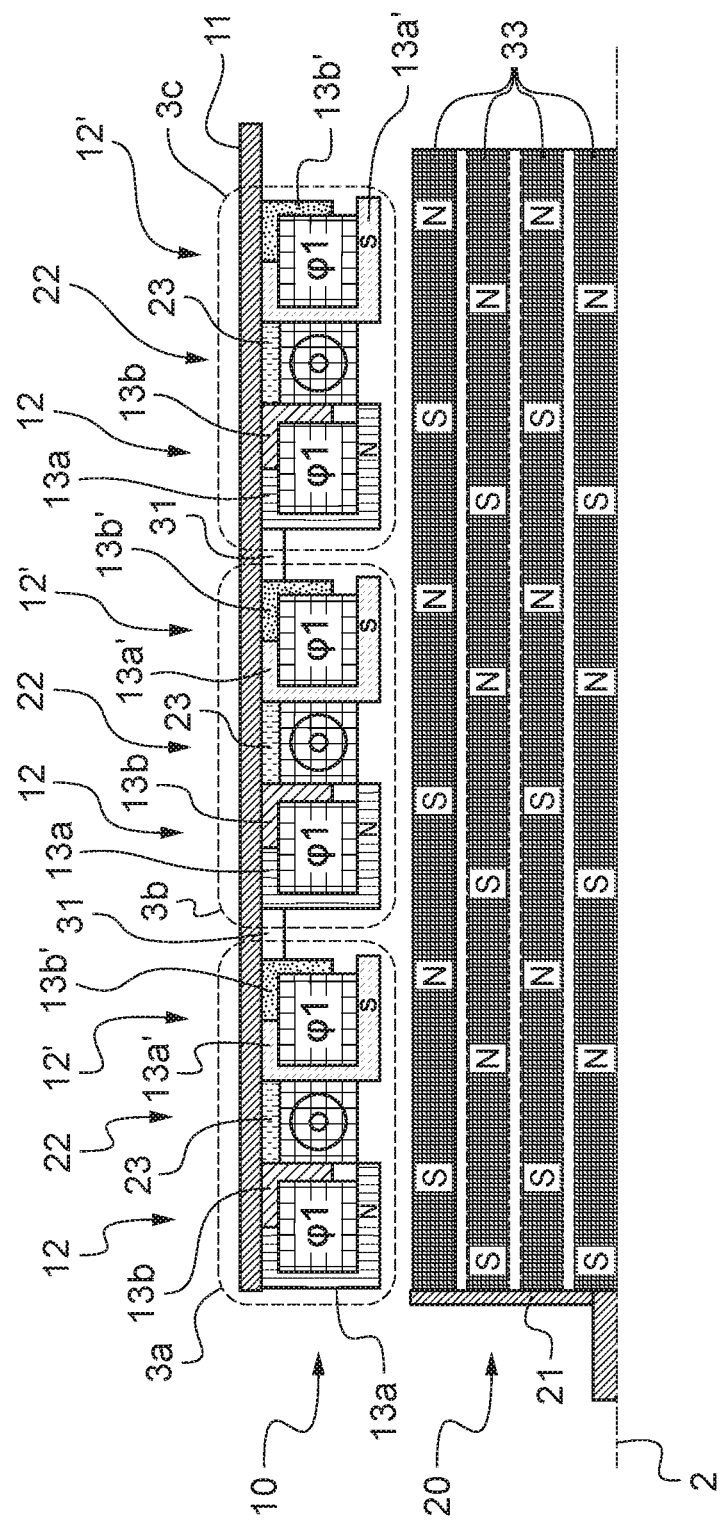

Since the exciter units 3a, 3b, 3c are magnetically isolated by the spacers 31, each strip 33 of the rotor 20 can co-operate with a plurality of exciter units 3a, 3b, 3c, as shown in FIGS. 17 and 19. Each strip 33 then has a plurality of first north poles and a plurality of first south poles, a pair of first north and south poles co-operating with a single exciter unit 3a, 3b, or 3c.

Nevertheless, the electric machine 1 may also have three series 35a, 35b, 35c of strips 33, as shown in FIG. 18, each series 35a, 35b, 35c being isolated from the other series 35a, 35b, 35c by the structure 21 of the rotor 20. Thus, each series 35a, 35b, 35c of strips 33 has a single first north pole and a single first south pole, and thus co-operates with a single exciter unit 3a, 3b, or 3c.

Furthermore, when the electric machine 1 has a plurality of series 35a, 35b, 35c of strips 33, these series 35a, 35b, 35c being mutually isolated, adjacent exciter units 3 need not be magnetically isolated. The magnetic fluxes F1, F2 circulating in the assemblies formed by any one series 35 of strips and its exciter unit 3a, 3b, 3c are separated by virtue of the isolation between these series 35a, 35b, 35c of strips 33.

These exciter units 3a, 3b, 3c may come into contact with one another via a yoke 13 of two adjacent secondary magnetic circuits 12, 12'.

Figure 21:
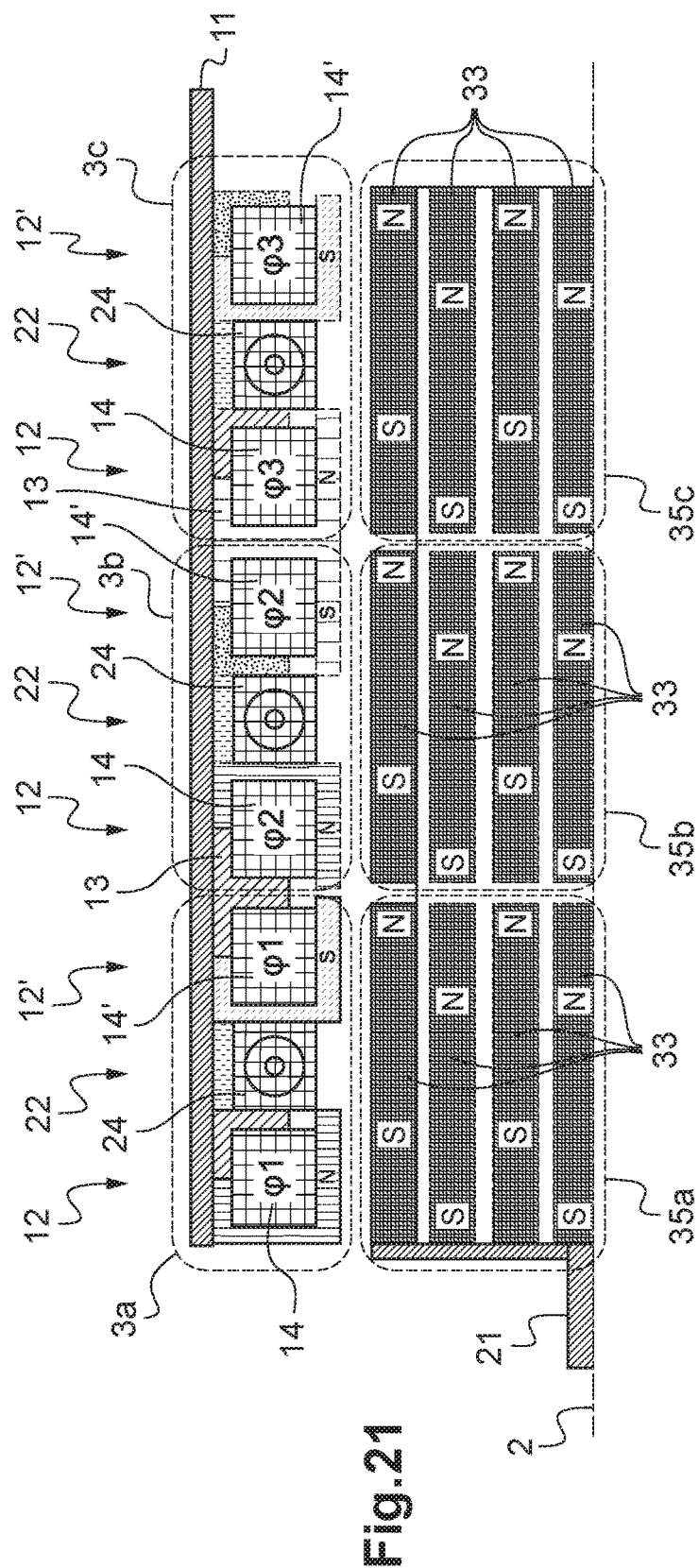

Furthermore, under such circumstances, it is possible to unite two yokes 13 of two adjacent secondary magnetic circuits 12, as shown in FIGS. 20 and 21 so as form a single yoke 13.

This yoke 13 thus separates the two secondary windings 14, 14' of these two adjacent secondary magnetic circuits 12, 12'. This yoke 13 has two rows of teeth 15 that are distributed on a common extreme flank 131, each row of teeth 15 co-operating with a single secondary winding 14, 14' and with a single series 35a, 35b, 35c of strips 33. Two first magnetic fluxes F1 relating respectively to the two primary magnetic circuits 22 with which these two adjacent secondary magnetic circuits 12 and 12' co-operate and the two secondary magnetic fluxes F2 relating respectively to these two adjacent secondary magnetic circuits 12, 12' circulate independently in the yoke 13 so as to generate rotation of the rotor 20.

In addition, the primary windings 24 of these exciter units 3a, 3b, 3c are powered by DC whereas the secondary windings 14, 14' are powered by AC.

The primary windings 24 preferably convey the same DC.

In contrast, the secondary windings 14, 14' may be powered either with the same AC or else with different ACs. Nevertheless, the two secondary windings 14, 14' of a single exciter unit 3 are always powered by the same AC.

Firstly, the secondary windings 14, 14' of these exciter units 3a, 3b, 3c may be powered by the same single-phase AC $\varphi 1$, as shown in FIG. 17.

Thereafter, the secondary windings 14, 14' of these exciter units 3a, 3b, 3c may also be powered by single-phase AC $\varphi 1$, however the secondary windings 14, 14' of some of the exciter units 3a, 3b, 3c, such as the central exciter unit 3b in FIGS. 18 and 20, may be powered by single-phase AC of opposite phase $-\varphi 1$.

Finally, the secondary windings 14, 14' of these exciter units 3a, 3b, 3c may be powered by balanced three-phase AC, the secondary windings 14, 14' of each exciter unit 3a, 3b, 3c being powered by a respective phase $\varphi 1$, $\varphi 2$, $\varphi 3$ of this three-phase AC.

Naturally, the present invention may be subjected to numerous variations as to its implementation. Although several embodiments are described above, it should readily be understood that it is not conceivable to identify exhaustively all possible embodiments. It is naturally possible to envisage replacing any of the means described by equivalent means without going beyond the ambit of the present invention.

What is claimed is:

1. A separately excited electric machine comprising:
   an axis of rotation;
   a stator provided with a structural member and a plurality of windings of annular shape around the axis of rotation;
   a rotor rotatable about the axis of rotation and provided with a structure and a plurality of strips, the strips being regularly distributed angularly around the axis of rotation, each strip being made of ferromagnetic material and being magnetically isolated from the other strips;
   the stator having at least one exciter unit, the exciter unit being provided with two secondary magnetic circuits and one primary magnetic circuit, the primary magnetic circuit co-operating with the secondary magnetic circuits;
   each secondary magnetic circuit having a respective stator exciter winding and two annular yokes; and
   each primary magnetic circuit comprising a rotor exciter winding for passing direct current;
   wherein:
   each yoke is of C-shaped section and comprises three flanks, comprising two extreme flanks and a central flank, and a plurality of teeth each having a base and a tip, the teeth being distributed over at least one extreme flank in angularly regular manner around the axis of rotation, the base being connected to the central flank, the stator exciter winding being positioned inside the yokes and being for passing an alternating current;

the teeth of the two yokes of a secondary magnetic circuit interfitting mutually in one another over at least one face of the stator exciter winding of the secondary magnetic circuit facing the strips while maintaining a first distance between one another;

a tooth of one secondary magnetic circuit being collinear with a tooth of the other secondary magnetic circuit of the exciter unit, the tips of the two collinear teeth pointing in the same direction, the tips and the bases of these two teeth being in alignment;

each strip having at least one first north pole and at least one first south pole as a result of first magnetic fluxes circulating in the strips on being generated by the rotor exciter winding;

the teeth including in alternation second north poles and second south poles as a result of second magnetic fluxes generated by the stator exciter windings circulating in the yokes, the teeth of a yoke having the second poles of the same polarity, two adjacent teeth of two yokes having the second poles of opposite polarities;

an airgap thus being formed between the first poles of the strips and the second poles of the yokes; and each yoke having the same number of teeth, the number of teeth of a secondary magnetic circuit being equal to the number of strips co-operating with the secondary magnetic circuits, the total number of first poles of the electric machine being equal to the total number of second poles of the electric machine.

2. A separately excited electric machine according to claim 1, wherein the tip of each tooth projects beyond the stator exciter winding, each central flank not projecting beyond the stator exciter winding, the end of the tip of a tooth of a yoke of one secondary magnetic circuit being in alignment on the outside face of the central flank of the other yoke of the secondary magnetic circuit.

3. A separately excited electric machine according to claim 1, wherein the first and second extreme flanks of each yoke and the strips are positioned perpendicularly to the axis of rotation so that each magnetic flux circulates axially through each airgap in the electric machine.

4. A separately excited electric machine according to claim 1, wherein the first and second extreme flanks of each yoke and the strips are positioned parallel to the axis of rotation so that each magnetic flux circulates radially through each airgap in the electric machine.

5. A separately excited electric machine according to claim 1, wherein each tooth is in the shape of a "cat's tongue".

6. A separately excited electric machine according to claim 1, wherein each tooth is in "staircase" shape.

7. A separately excited electric machine according to claim 1, wherein each yoke includes a chamfer-shaped connection at the base of each tooth.

8. A separately excited electric machine according to claim 1, wherein the rotor has a single internal or external portion rotatable inside or outside the stator, the strips being on the internal or external single portion, the teeth being distributed over a single extreme flank of the yokes facing the strips, each primary magnetic circuit comprising a ring of annular shape around the axis of rotation and positioned on a face of the rotor exciter winding opposite from the strips, the ring magnetically connecting together one of the yokes of each of the secondary magnetic circuits of the exciter unit.

9. A separately excited electric machine according to claim 1, wherein the rotor has an internal portion rotatable inside the stator and an external portion rotatable outside the stator, the strips being distributed respectively on the internal portion and on the external portion facing the teeth of each yoke, the teeth being distributed over both of the extreme flanks of the yokes, each primary magnetic circuit being constituted solely by the rotor exciter winding.

10. A separately excited electric machine according to claim 8, wherein within each exciter unit, both of the secondary magnetic circuits are positioned side by side, the primary magnetic circuit being positioned along both of the secondary magnetic circuits over respective faces of both secondary magnetic circuits facing away from the strips, the ring having at least three flanks thus boxing in the rotor exciter winding.

11. A separately excited electric machine according to claim 8, wherein within the exciter unit, the primary magnetic circuit is positioned between two secondary magnetic circuits, the primary magnetic circuit co-operating with both of the secondary magnetic circuits.

12. A separately excited electric machine according to claim 1, wherein the electric machine has a plurality of exciter units that are magnetically isolated from one another in order to avoid magnetic leaks, the rotor having a single series of strips, each strip co-operating with each exciter unit and having a plurality of first north poles and a plurality of second north poles.

13. A separately excited electric machine according to claim 1, wherein the electric machine has a plurality of exciter units that are magnetically isolated from one another in order to avoid magnetic leaks, the rotor having a plurality of series of strips, the series of strips being magnetically isolated from one another, each strip co-operating with a single exciter unit and having a single first north pole and a single first south pole.

14. A separately excited electric machine according to claim 10, wherein the electric machine has a plurality of exciter units that are not magnetically isolated from one another, the rotor having a plurality of series of strips, the series of strips being magnetically isolated from one another in order to avoid magnetic leaks, each strip co-operating with a single exciter unit and having a single first north pole and a single first south pole.

15. A separately excited electric machine according to claim 12, wherein two adjacent exciter units are magnetically isolated by a non-magnetic spacer.

16. A separately excited electric machine according to claim 14, wherein two adjacent exciter units use a common yoke, the yoke having two rows of teeth over at least one extreme flank, first and second magnetic fluxes circulating independently in each yoke.

17. A separately excited electric machine according to claim 1, wherein the two stator exciter windings of at least three exciter units are powered by three different phases of balanced three-phase alternating currents.

18. A separately excited electric machine according to claim 1, wherein the two stator exciter windings of each exciter unit are powered by the same single-phase AC.

* * * * *